(12) United States Patent
Obuchi et al.

(10) Patent No.: US 7,392,451 B2
(45) Date of Patent: Jun. 24, 2008

(54) PACKET DATA RETRANSMISSION CONTROL METHOD AND SYSTEM

(75) Inventors: Kazuhisa Obuchi, Kawasaki (JP); Tetsuya Yano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 768 days.

(21) Appl. No.: 10/856,212

(22) Filed: May 28, 2004

(65) Prior Publication Data

US 2004/0218561 A1 Nov. 4, 2004

Related U.S. Application Data

(63) Continuation of application No. PCT/JP01/10522, filed on Nov. 30, 2001.

(51) Int. Cl.
G08C 25/02 (2006.01)
H04L 1/18 (2006.01)
H04L 1/14 (2006.01)
(52) U.S. Cl. ........................................ 714/748; 714/750
(58) Field of Classification Search ................. 714/748, 714/750
See application file for complete search history.

(56) References Cited

U.S. PATENT DOCUMENTS 6,377,560 B1* 4/2002 Dailey .......................... 370/329
6,839,559 B2* 1/2005 Ikeda et al. .................. 455/442

FOREIGN PATENT DOCUMENTS

| JP | 09-231139 | 9/1997 |
| JP | 11-308657 | 11/1999 |
| JP | 2001-237753 | 8/2001 |
| WO | 00/05909 | 2/2000 |
| WO | 01/71521 | 9/2001 |

OTHER PUBLICATIONS

Supplementary European Search Report dated May 21, 2007, from the corresponding European Application.
International Search Report dated Feb. 12, 2002.

* cited by examiner

*Primary Examiner*—Joseph D. Torres
(74) *Attorney, Agent, or Firm*—Katten Muchin; Rosenman LLP

(57) ABSTRACT

A packet data retransmission control method, where a base-station upper-level control system transmits downstream packet data, which is terminated at a terminal station, to a plurality of base stations. A specific base station that is one of the base stations transfers the downstream packet data to the terminal station. The plurality of base stations receive an upstream control signal with which reception of the downstream packet data is acknowledged and which is returned from the terminal station. Base stations other than the specific base station notify the specific base station via the base-station upper-level control system that they have received the upstream control signal. The specific base station determines packet data to be retransmitted according to the receiving situation thereof for the upstream control signal returned from the terminal station and the receiving situations of the other base stations for the upstream control signal.

13 Claims, 24 Drawing Sheets

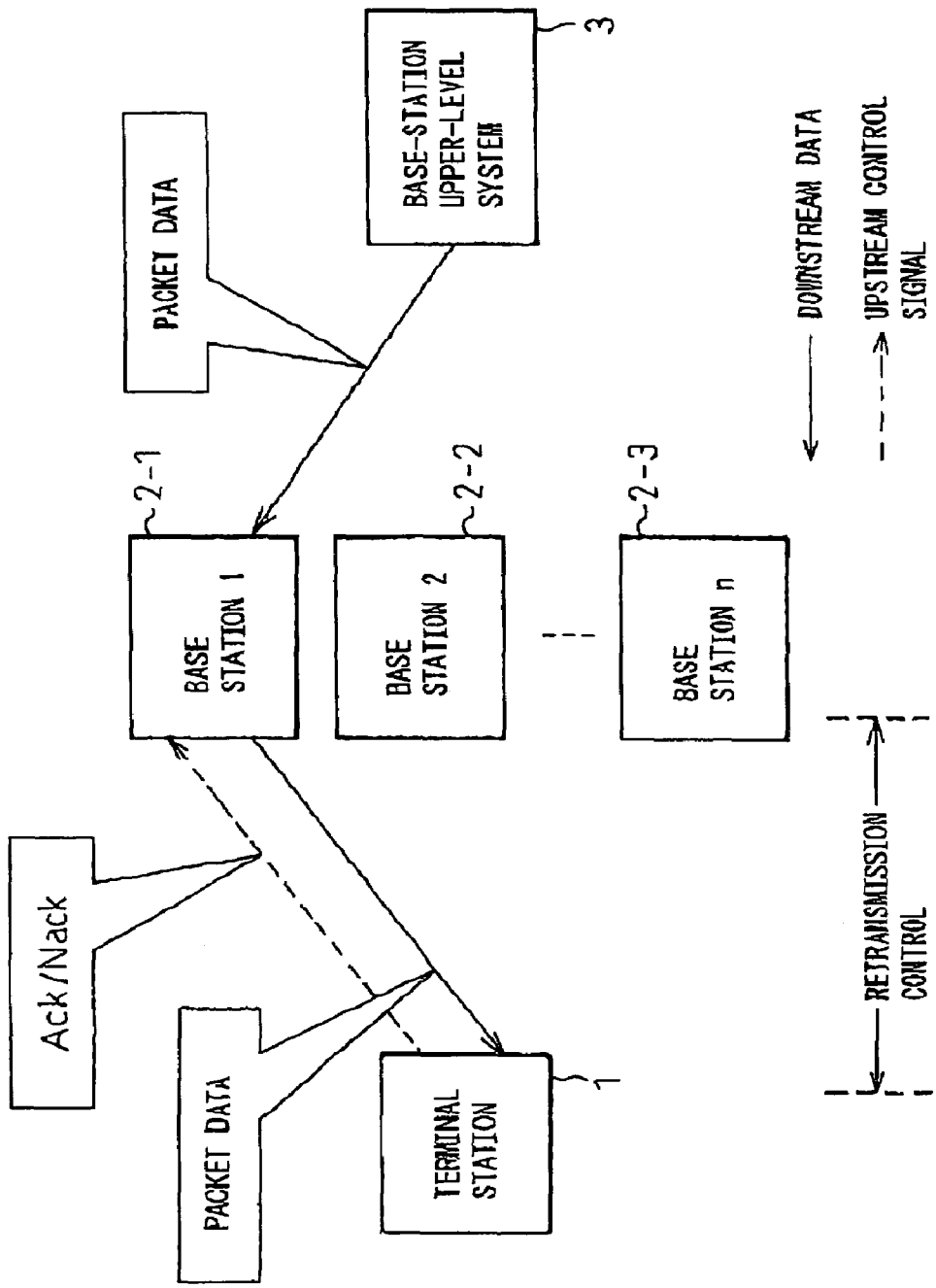

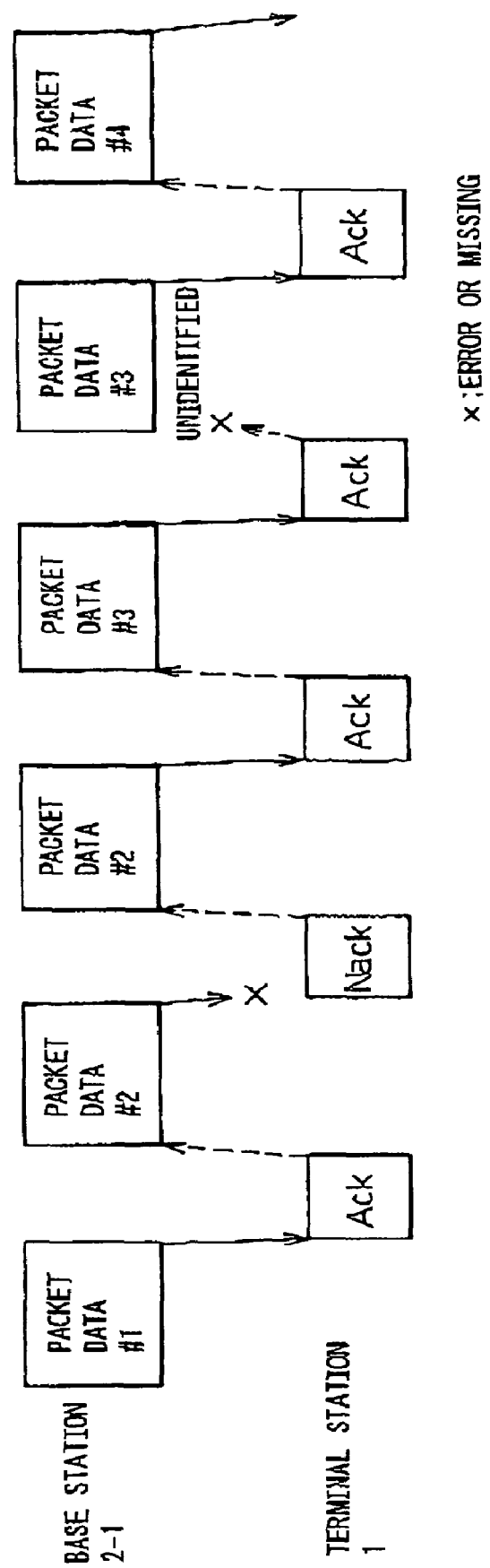

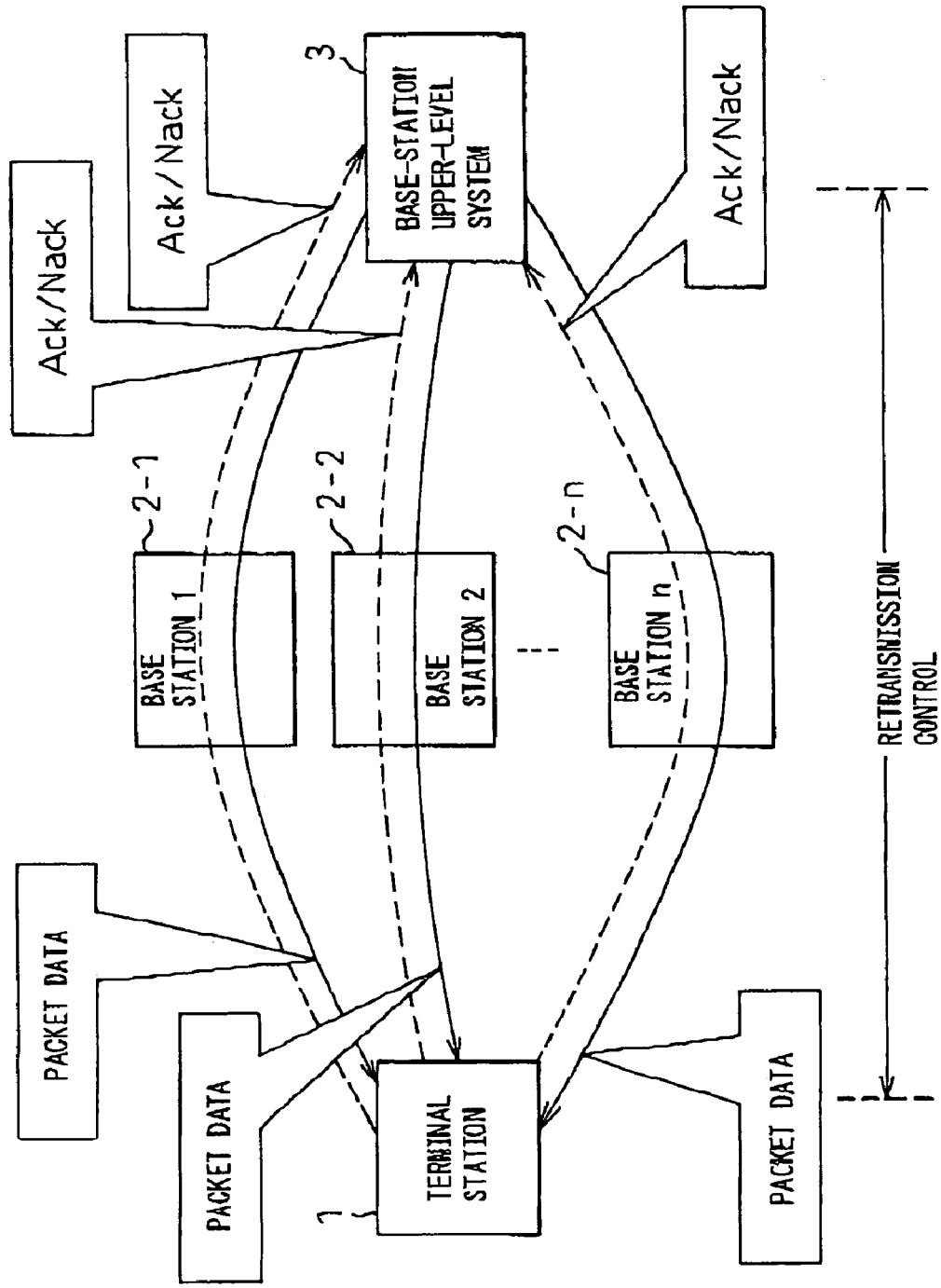

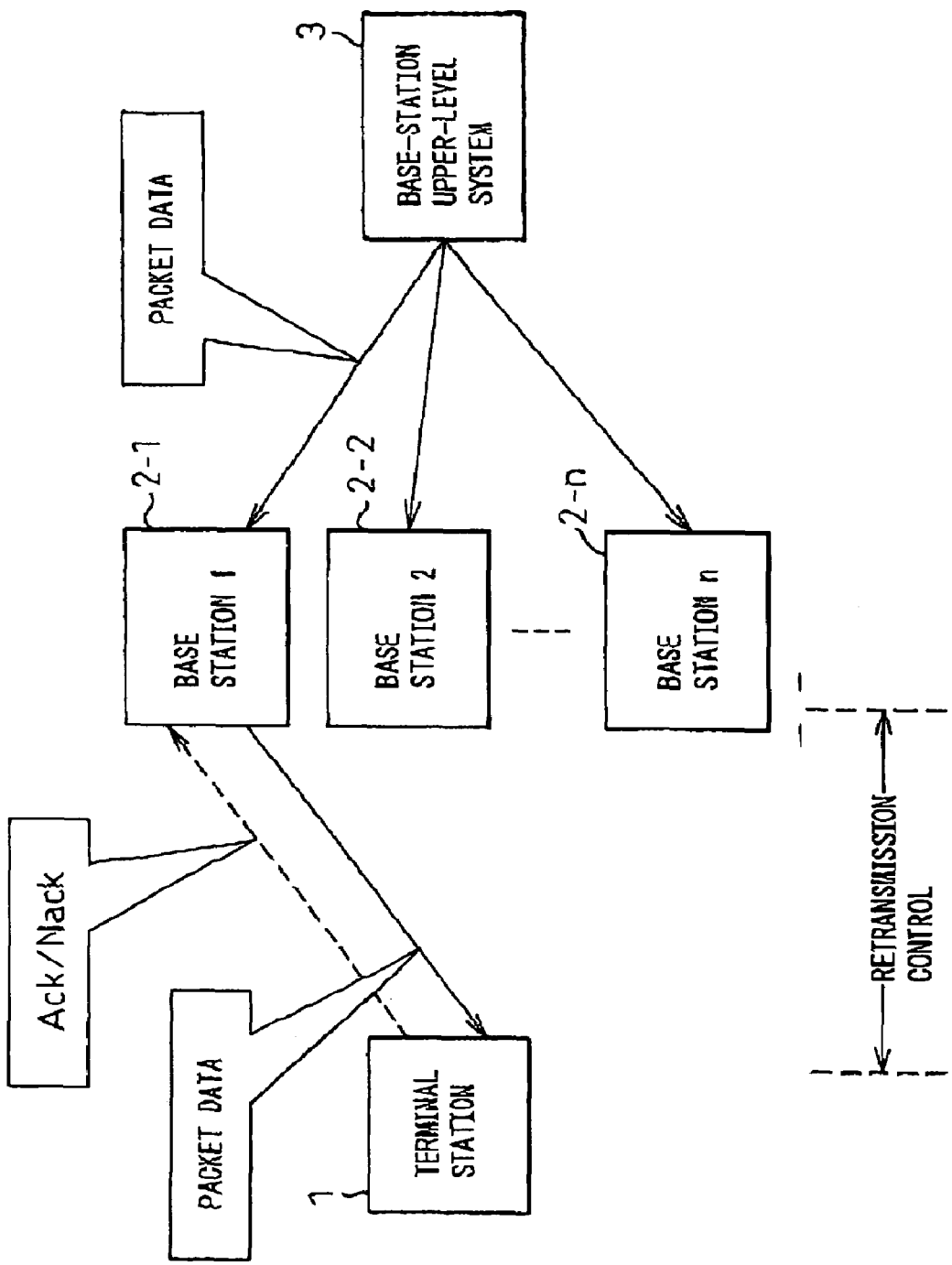

Fig.5

| METHOD | EQUIPMENT INVOLVED | DIVERSITY HANDOVER GAIN | LINE OCCUPANCY RATE | RETRANSMISSION CONTROL (MAINLY, DELAY) |
|---|---|---|---|---|
| NORMAL RETRANSMISSION CONTROL | BASE STATION AND TERMINAL STATION | × | ○ | ○ |
| RETRANSMISSION CONTROL BASED ON W-CDMA | BASE-STATION UPPER-LEVEL SYSTEM AND TERMINAL STATION | ○ | × | × |
| RETRANSMISSION CONTROL BASED ON W-CDMA COMBINED WITH HSDPA | BASE STATION AND TERMINAL STATION | × | ○ | ○ |

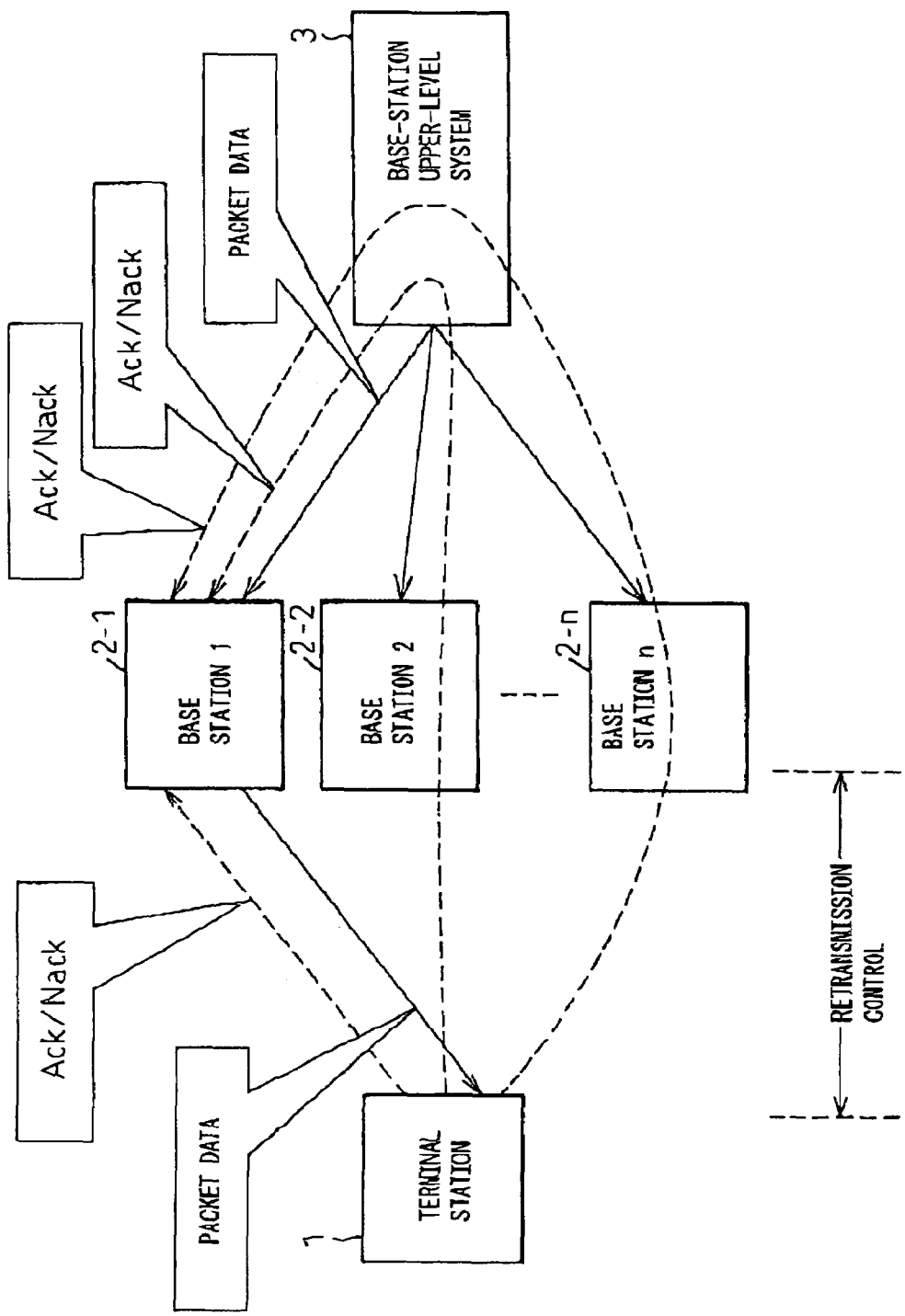

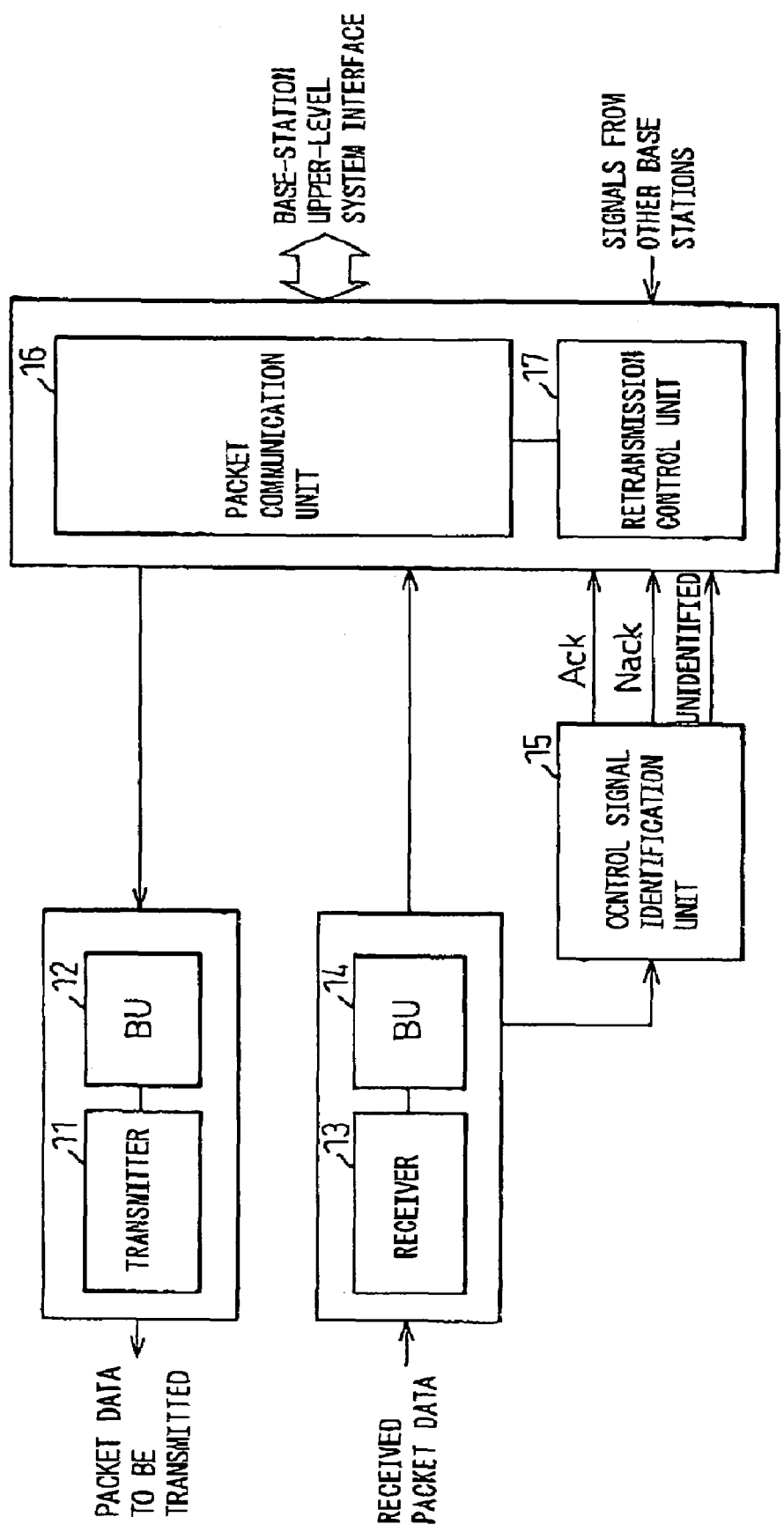

Fig.17

| METHOD | EQUIPMENT INVOLVED | DIVERSITY HANDOVER GAIN | LINE OCCUPANCY RATE | RETRANSMISSION CONTROL (MAINLY DELAY) |
|---|---|---|---|---|
| FIRST METHOD OF PRESENT INVENTION | BASE STATION AND TERMINAL STATION | △ | ○ | △ |
| SECOND AND THIRD METHODS OF PRESENT INVENTION | BASE STATION AND TERMINAL STATION | △ | △ | ○ |

PACKET DATA RETRANSMISSION CONTROL METHOD AND SYSTEM

CROSS-REFERENCE TO RELATED APPLICATION

This application is a continuation application and is based upon PCT/JP01/10522, filed on Nov. 30, 2001.

BACKGROUND OF THE INVENTION

1. Field of the Invention

The present invention relates to packet data communication. More particularly, the present invention is concerned with a packet data retransmission control method, and a system, that enjoy high efficiency in retransmission due to efficient reception of an upstream control signal Ack or Nack during high-speed downstream packet data transmission based on the high-speed downlink packet access (HSDPA) technology or the like.

2. Description of the Related Art

With the advent of the asynchronous digital subscriber line (ADSL) technology or the like, high-speed data transmission that is especially fast in transmission of downstream data is prevailing among households. Accordingly, mobile radio communication is requested to be especially fast in transmission of downstream data. For the wideband-code division multiple access (WCDMA) technology that is one of the new-generation portable cellular phone systems (International Mobile Telecommunications (IMT)-2000), HSDPA is likely to be adopted as a standard technology for high-speed downstream data transmission (WCDMA is referred to as 3GPP TR25.308).

FIG. 1 shows an example of a normal retransmission control form in which retransmission control is exchanged between a base station and a mobile station or a terminal station. FIG. 2 shows an example of retransmission of packet data shown in FIG. 1.

Referring to FIG. 1, a base-station upper-level system 3 transfers packet data to a base station 2-1 that accommodates a terminal station 1 which is a data terminating side. The base station 2-1 transfers the received packet data to the terminal station 1. In this case, the terminal station 1 returns an upstream control signal Ack or Nack, with which reception of packet data is acknowledged, to the base station 2-1 that is the data transferring side.

A description will be made by taking the case shown in FIG. 2 for instance. The base station 2-1 transmits packet data 1 received from the base-station upper-level system 3 to the terminal station 1. When the terminal station 1 receives the packet data 1 correctly, the terminal station 1 returns a signal Ack to the base station 2-1. Consequently, the base station 2-1 judges that the packet data 1 has been transmitted correctly, and transmits the next packet data 2 to the terminal station 1. In this case, a data error occurs, and the terminal station 1 returns a signal Nack to the base station 2-1. Consequently, the base station 2-1 judges that the packet data 2 has not been correctly transferred, and retransmits the packet data 2 to the terminal station 1.

Furthermore, in this case, if an acknowledgement response to the packet data 3, which is sent from the base station 2-1, returned from the terminal station 1 is not received or is unidentified, the base station 2-1 judges that the packet data 3 has not been correctly transferred. The base station 2-1 then retransmits the packet data 3 to the terminal station 1. Normal retransmission control is exchanged directly between the base station and the terminal station.

FIG. 3 shows as other example of a retransmission control form an example of a retransmission control form based on a technology other than HSDPA combined with WCDMA.

Herein, a site diversity method is adopted in order to produce a large diversity handover gain, so that a plurality of base stations 2-1 to 2-n will transmit or receive a signal to or from the terminal station 1. Actions to be performed according to the method will be described by taking the same case as that shown in FIG. 2 for instance. Assuming that downstream packet data is transmitted, the base-station upper-level system 3 transfers the same packet data to the base stations 2-1 to 2-n. The base stations 2-1 to 2-n each transmit the same packet data 1 to the terminal station 1.

The terminal station 1 synthesizes all the packet data items 1 received from the respective base stations 2-1 to 2-n or selects any of the packet data items 1. If the received packet data 1 is correct, the terminal station 1 returns a signal Ack to each of the base stations 2-1 to 2-n. If the next packet data 2 cannot be received correctly, the terminal station 1 returns a signal Nack to each of the base stations 2-1 to 2-n.

Each of the base stations 2-1 to 2-n receives the signal Ack or Nack and transmits the result of reception to the base-station upper-level system 3. The base-station upper-level system 3 judges whether the packet data has been correctly transferred through synthesis of n signals or selection of any of the n signals. If the base-station upper-level system 3 judges that the packet data has been transferred correctly, it transmits the next packet data. If the base-station upper-level system 3 judges that the packet data has not been correctly transferred, it retransmits the same packet data. If neither the signal Ack nor the signal Nack is returned (identified) as a response with which reception of the packet data 3 is acknowledged, that is, if an unidentified signal is returned, the signal Nack is judged to have been returned. The packet data 3 is then retransmitted. Thus, in the retransmission control form based on a technology other than HSDPA combined with WCDMA, retransmission control involves the base-station upper-level system 3 and terminal station 1.

FIG. 4 shows, as another example of a retransmission control form, a retransmission control form based on WCDMA combined with HSDPA.

Even when WCDMA is adopted, if WCDMA is combined with HSDPA, basic retransmission control is, similarly to normal retransmission control in the form shown in FIG. 1, exchanged between the base station 2-1 and the terminal station 1. The retransmission control process is identical to that described in conjunction with FIG. 2. However, in this example, from whichever of the base stations 2-1 to 2-n the terminal station 1 will receive packet data cannot be designated. The base-station upper-level system 3 transmits packet data to the plurality of base stations 2-1 to 2-n.

According to HSDPA, although a diversity handover gain is sacrificed, retransmission control is supposed to be exchanged between the base station and the terminal station. In a retransmission control process based on WCDMA not combined with HSDPA, a gain in reception is guaranteed by the site diversity method. However, when a large amount of data is transferred at a high speed, as a plurality of transmission lines is occupied, a line occupancy rate decreases. Moreover, when a transfer method that modifies a physical configuration, such as, a method of transmitting a different redundant bit at every time of retransmission, a method of modifying a data length to be interleaved, or a method of changing modulation forms (quaternary, octal, hexadecimal, etc.) is adopted for retransmission, WCDMA not combined with HSDPA cannot be adopted.

FIG. 5 lists the aforesaid three conventional retransmission control methods for comparison.

As seen from FIG. 5, according to the normal retransmission control method and the retransmission control method based on WCDMA combined with HSDPA, retransmission control is exchanged between a base station and a terminal station. This is advantageous in terms of a line occupancy rate or a delay time in retransmission. The normal retransmission control method and the retransmission control method based on WCDMA combined with HSDPA are nearly identical to each other except a data transmission rate. On the other hand, according to the retransmission control method based on WCDMA not combined with HSDPA, retransmission control is exchanged between a base-station upper-level system and a terminal station in order to produce a diversity handover gain. Although production of a diversity handover gain is advantageous, this method is disadvantageous in terms of the line occupancy ratio or the delay time in is retransmission.

SUMMARY OF THE INVENTION

Accordingly, an object of the present invention is to provide a packet data retransmission control method and system that control retransmission according to HSDPA technology or the like, which is advantageous in terms of a line occupancy rate or a delay time in retransmission, during high-speed large-capacity data transmission that will be the mainstream of data transmission. Moreover, the packet data retransmission control method and system enjoy a more highly efficient control of retransmission owing to a further improved line occupancy rate or a further reduced delay time in retransmission. More particularly, the present invention provides a packet data retransmission control method and system that efficiency receive an upstream control signal Ack or Nack during high-speed downstream packet data transmission based on HSDPA technology or the like, and that thus enjoy improved efficiency in retransmission.

According to the present invention, a packet data retransmission control method is adapted to a network accommodating a base-station upper-level control system, a plurality of base stations subordinate to the base-station upper-level control system, and a terminal station. According to the packet data retransmission control method, the base-station upper-level system transmits downstream packet data, which should be terminated at the terminal station, to the plurality of base stations. A specific base station that is one of the base stations transfers the downstream packet data to the terminal station. The plurality of base stations receives an upstream control signal, with which reception of the downstream packet data is acknowledged, from the terminal station. The base stations other than the specific base station notify the specific base station via the base-station upper-level control system that they have received the upstream control signal. The specific base station determines packet data, which should be retransmitted, according to the receiving situation for the upstream control signal returned from the terminal station and the receiving situations of the other base stations for the upstream control signal.

The specific base station judges from the receiving situation for the upstream control signal returned from the terminal station whether an acknowledgement response, a negative acknowledgement response, or an unidentified response is returned as a result of receiving the downstream packet data from the terminal station. If the acknowledgement response is judged to be returned, succeeding packet data is transmitted. If the negative acknowledgement response is judged to be returned, packet data is retransmitted. If the unidentified response is judged to be returned, the upstream control signals whose reception is notified by the other base stations are waited for in order to judge whether packet data should be retransmitted.

Furthermore, if the unidentified response is judged to be returned, the specific base station retransmits packet data. If the upstream control signals whose reception is notified by the other base stations carry the acknowledgement response, a response to the retransmitted packet data is not checked but succeeding packet data is immediately transmitted. If the unidentified response is judged to be returned, succeeding packet data is transmitted. If the upstream control signals whose reception is notified by the other base stations carry the negative acknowledgement response, packet data is retransmitted.

According to the present invention, there is provided a base station on a network accommodating a base-station upper-level control system, a plurality of base stations subordinate to the base-station upper-level control system, and a terminal station. Herein, the base station comprises: a packet communication means for transferring downstream packet data, which is received from the base-station upper-level control system, to the terminal station and receiving an associated upstream control signal from the terminal station; a signal identification means for identifying the upstream control signal, which the packet communication means has received, as an acknowledgement response, a negative acknowledgement response, or an unidentified response; and a retransmission control means for controlling retransmission of the downstream packet data according to the result of identification performed by the signal identification means and upstream control signals which the terminal station has returned and which other base stations that do not control retransmission have received via the base-station upper-level control system. If the result of identification performed by the signal identification means is an acknowledgement response or a negative acknowledgement response, packet data concerned is retransmitted. If the result of identification is an unidentified response, retransmission is controlled based on the upstream control signals sent from the other base stations.

The signal identification means identifies the unidentified response according to a predetermined bit error rate of the upstream control signal returned from the terminal station or a predetermined received signal level. Moreover, when the result of identification performed by the signal identification means is the unidentified signal, if no upstream control signals are transmitted from the other base stations, the retransmission control means infers that the negative acknowledgement response or acknowledgment response is returned, and controls retransmission. Thereafter, the retransmission control means waits for the upstream control signals sent from the other base stations, and formally controls retransmission. The reliability of a received upstream control signal may be appended to a notification that an upstream control signal has been received. The other base stations notify the base station via the base-station upper-level control system, which controls retransmission, that they have received the upstream control signal returned from the terminal station only when the received upstream control signal carries the acknowledgement response. The notification is transmitted in response to a request issued from the base station that controls retransmission.

According to the present invention, there is provided a base-station upper-level system included in a network system in which: the base-station upper-level control system transmits packet data, which should be terminated at a terminal station, to a plurality of base stations; and among the plurality of base stations, a specific base station designated by the terminal station transfers the packet data to the terminal station, but the other base stations do not transfer the packet data to the terminal station. The base-station upper-level control system comprises: a receiver that receives from the other base stations a signal returned as a result of reception of the packet data from the terminal station; and a transmitter that transmits the signals, which are received by the receiver and returned as a result of reception of the packet data from the terminal station, to the specific base station.

BRIEF DESCRIPTION OF THE DRAWINGS

FIG. 1 shows an example of a normal retransmission control form in which retransmission control is exchanged between a base station and a mobile station or a terminal station;

FIG. 2 shows an example of retransmission of packet data in the form shown in FIG. 1;

FIG. 3 shows an example of a retransmission control form based on a technology other than HSDPA combined with WCDMA;

FIG. 4 shows an example of a retransmission control form based on WCDMA combined with HSDPA;

FIG. 5 lists three conventional retransmission control methods for comparison;

FIG. 6 shows a basic retransmission control form in accordance with the present invention;

FIG. 7 is a block diagram showing an example of the configuration of a base station employed in the present invention;

FIG. 17 lists the first to third retransmission control methods in accordance with the present invention;

DESCRIPTION OF THE PREFERRED EMBODIMENTS

Figure 8:
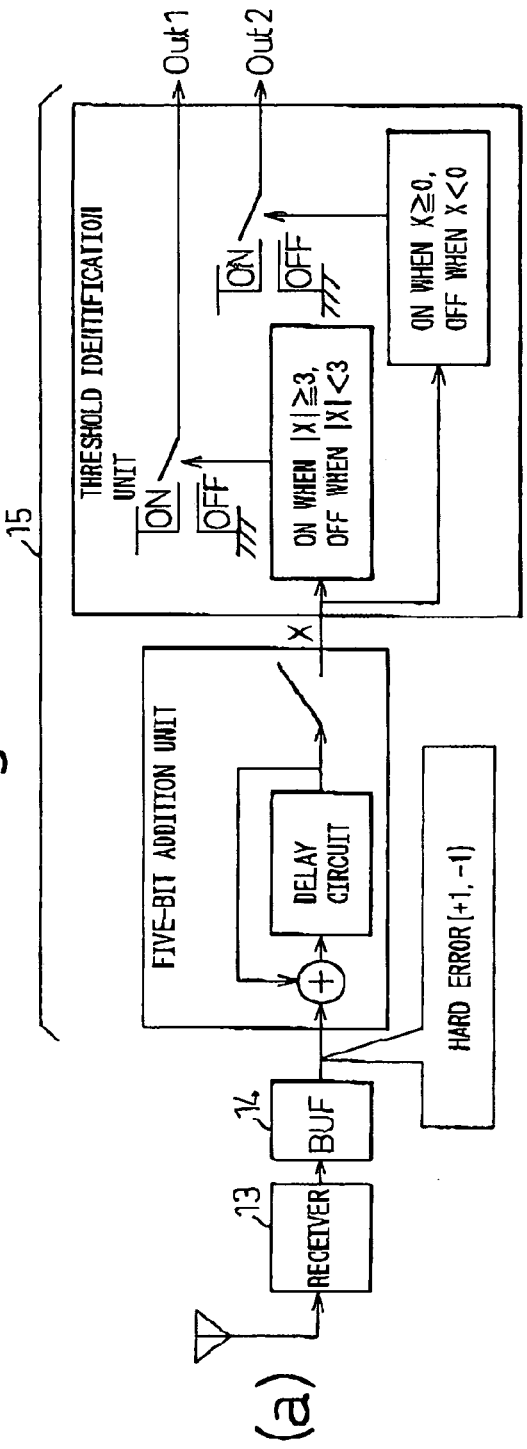
FIG. 8A and FIG. 8B show an example of the configuration of a control signal identification unit shown in FIG. 7.

FIG. 6 shows a basic retransmission control form in accordance with the present invention.

In principle, according to the present invention, retransmission control is exchanged between a base station and a terminal station. Downstream packet data to be terminated at a terminal station 1 is transmitted from a main base station 2-1. A plurality of base stations 2-1 to 2-n receives an upstream control signal Ack or Nack which originates from the terminal station 1 and which signifies whether the downstream packet data has been correctly received. Consequently, as the high-speed downstream packet data is transmitted from the one main base station 2-1, a line occupancy rate decreases. Moreover, finally, the main base station 2-1 receives the upstream control signal that carries a small amount of data according to the diversity reception method, consequently, a delay time in retransmission can be reduced, and the efficiency in retransmission can be improved.

FIG. 7 is a block diagram showing an example of the configuration of a base station employed in the present invention.

Referring to FIG. 7, a transmitter 11 comprises a modulation circuit and a radio-frequency (RF) transmission circuit, and transmits packet data, which is held in a transmission buffer 12, to the terminal station 1 via a base-station transmitting antenna that is not shown. A receiver 13 comprises an RF reception circuit and a demodulation circuit, and temporarily stores a signal, which is received via a base-station receiving antenna that is not shown, in a reception buffer 14. A control signal identification unit 15 reads an upstream control signal, which is received directly from the terminal station 1 in response to downstream packet data sent to the terminal station 1, from the reception buffer 14, and identifies the upstream control signal as an acknowledge signal Ack, a negative acknowledge signal Nack, or an unidentified signal.

A retransmission control unit 17 uses the values, which indicate the signals Ack and Nack and the unidentified signal respectively and are received from the control signal identification unit 15, and control signals, which the other base stations 2-2 to 2-n receive via a base-station upper-level system interface, to execute a retransmission control process based on the method of the present invention. A packet communication unit 16 communicates data, which is transferred between the terminal station 1 and base-station upper-level system 3, in units of a packet. Furthermore, the packet communication unit 16 cooperates with the retransmission control unit 17 in communicating packet data to be retransmitted.

FIG. 8A and FIG. 8B show an example of the configuration of the control signal identification unit 15.

In this example, an upstream control signal is assigned five bits for the purpose of identification of three values. In order to return an acknowledge response Ack, the terminal station 1 sets all the five bits to 1. In order to return a negative acknowledge response Nack, the terminal station 1 sets all the five bits to 0. Referring to FIG. 8A, a five-bit addition unit assigns +1 to a received bit of 1 or assigns −1 to a received bit of 0, and summates all the values assigned to the five received bits. For example, assuming that one bit of a signal Ack originated from the terminal station 1 undergoes an error, the sum of the values assigned to the five bits comes to +4−1=+3. If a receiving error is permitted up to one bit error, the sum of the values assigned to the signal Ack comes to −5 or −3. The sum of the values assigned to a signal Nack comes to −5 or −3. Moreover, the sum of the values assigned to an unidentified signal comes to −1 or +1. Thus, three values indicating the signals Ack and Nack and the unidentified signal respectively can be identified. A threshold identification unit shown in FIG. 8A is intended to explain the logical identification of the three values. The result of identification is retrieved from a truth table shown in FIG. 8B (on the basis of outputs Out1 and Out2).

Figure 9:
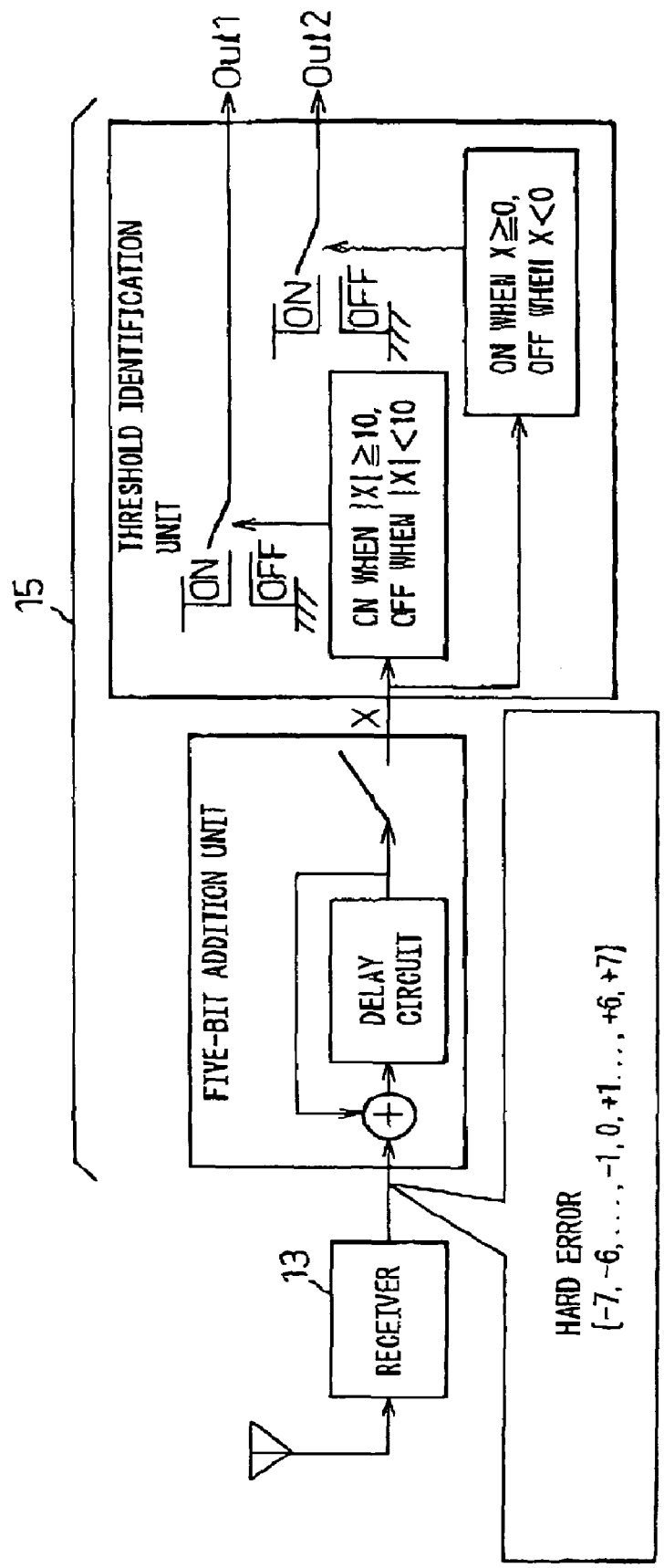
FIG. 9 shows another example of the configuration of the control signal identification unit shown in FIG. 7.

FIG. 9 shows another example of the configuration of the control signal identification unit 15.

In this example, the level of a signal demodulated by the receiver 13 is identified. For example, the level of one received bit is measured, and any of the values −7, −6, etc., −1, 0, +1, etc., +6, and +7 is assigned to the level. The other steps are identical to those described in conjunction with FIG. 8A and FIG. 8B. The five-bit addition unit summates all the values assigned to five received bits respectively. In this example, the sum of the values assigned to the signal Ack is +10 or more, the sum of the values assigned to the signal Nack is −10 or less, and the sum of the values assigned to the unidentified signal ranges from 10 to −10.

In consideration of the foregoing configuration of the base station, a retransmission control process based on the method of the present invention to be executed by the retransmission control unit 17 will be mainly described below. Incidentally, some of the actions to be performed by the packet communication unit 16 in relation to the actions of the retransmission control unit 17 will also be described below.

Figure 10:
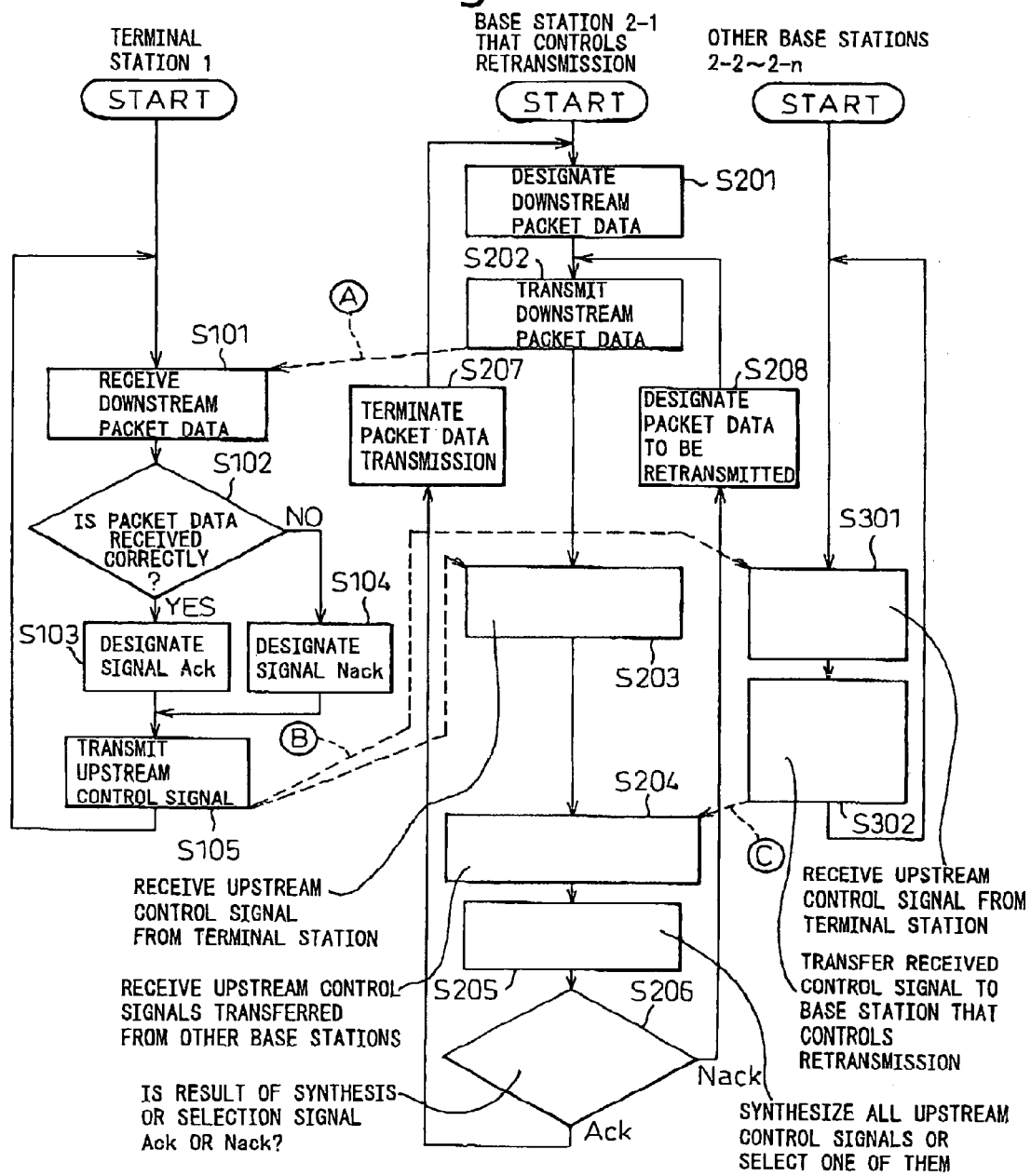
FIG. 10 is a flowchart describing a basic retransmission control process to be executed in the retransmission control form shown in FIG. 6.

FIG. 10 is a flowchart describing a basic transmission control process to be executed in the retransmission control form shown in FIG. 6.

Referring to FIG. 6 in relation to FIG. 10, the base-station upper-level system 3 transmits packet data to the plurality of base stations 2-1 to 2-n including the main base station 2-1. The main base station 2-1 transfers the received packet data to the terminal station 1 (S201 and S202). If the packet data is correct, the terminal station 1 transmits a signal Ack to each of the base stations 2-1 to 2-n. If the packet data is incorrect, the terminal station 1 transmits a signal Nack to each of the base stations 2-1 to 2-n (S101 to S105). Consequently, the main base station 2-1 receives the signal Ack or Nack (S203). Moreover, the other base stations 2-2 to 2-n transfer the signals Ack or Nack, which they have received, to the main base station 2-1 via the base-station upper-level system 3 (S301 and S302). The main base station 2-1 synthesizes n signals or selects one of the n signals so as to judge whether the packet data has been correctly transferred. If the main base station 2-1 judges that the packet data has been correctly transferred, it transmits the next packet data. If the main base Station 2-1 judges that the packet data has not been correctly transferred, it retransmits the same packet data (S204 to S208).

Incidentally, according to the foregoing basic process, the main base station 2-1 receives the signal Ack or Nack from the terminal station 1 (S203). Thereafter, a certain time elapses until the main base station 2-1 receives the signals Ack or Nack, which are returned from the terminal station 1, from the other base stations 2-2 to 2-n (S204). Therefore, the succeeding retransmission control actions (s205 to S208) are delayed.

Consequently, the present invention provides a retransmission control method described below.

Figure 11:
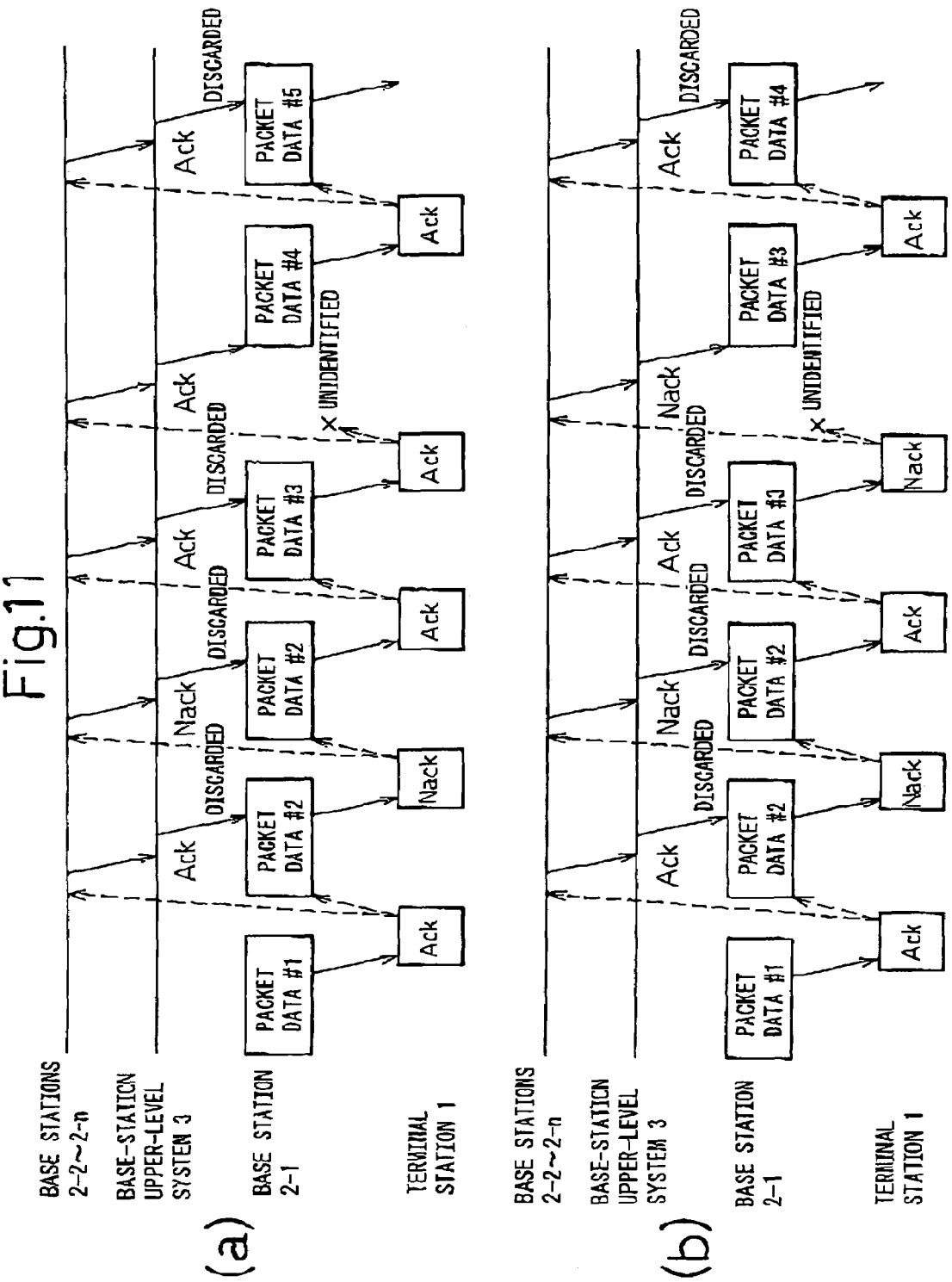
FIG. 11A and FIG. 11B show examples of retransmission of packet data in a first retransmission control method in accordance with the present invention.
Figure 12:
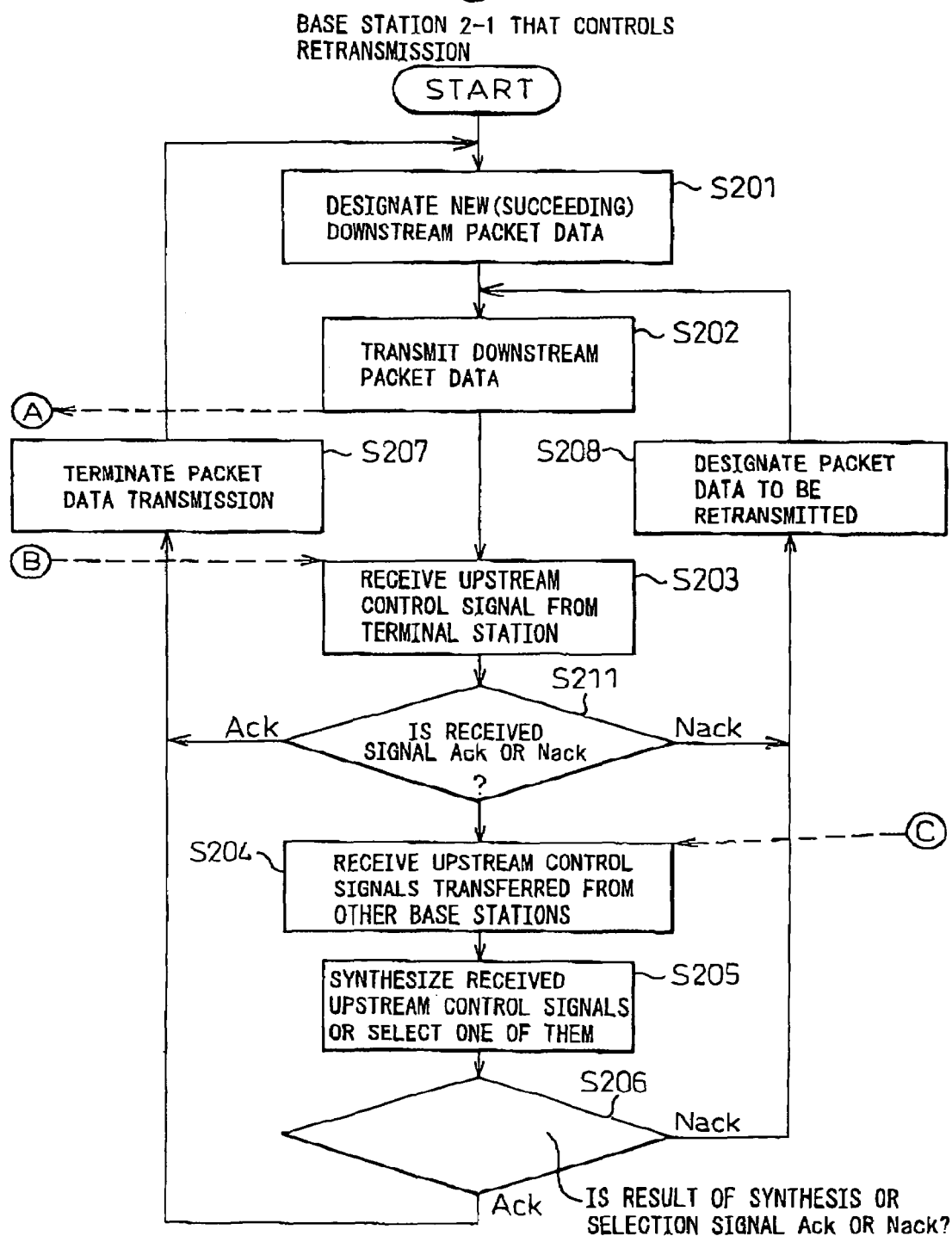
FIG. 12 is a flowchart describing an example of the first retransmission control method in accordance with the present invention.

FIG. 11 shows an example of retransmission of packet data in a first retransmission control method in accordance with the present invention. FIG. 12 is a flowchart describing an example of a first retransmission control process based on the method of the present invention. Incidentally, dashed lines A, B, and C in FIG. 12 indicate the same control flows as those A, B, and C in FIG. 10. Moreover, FIG. 12 shows only control flows that are followed by the main base station 2-1 and are different from those shown in FIG. 10 (the same applies to the subsequent flowcharts).

Herein, an upstream control signal the main base station 1-2 receives directly from the terminal station 1 is identified based on the values signifying the signals Ack and Nack and the unidentified signal respectively (the same applies to the subsequent examples). Referring to FIG. 11A, the terminal station 1 receives packet data 3 and returns the signal Ack. Referring to FIG. 11B, the terminal station 1 receives the packet data 3 and returns the signal Nack.

Referring to FIG. 11A, in principle, as soon as the main base station 2-1 receives the signal Ack or Nack directly from the terminal station 1 in response to transmitted packet data, the main base station 2-1 immediately performs the next action (S211). In this example, as the signal Ack is received in response to transmitted packet data 1, the terminal station 1 is judged to have received the packet data correctly. The next packet data 2 is immediately transmitted (S207). Since the signal Nack is received in response to the packet data 2, the same packet data 2 is immediately retransmitted (S208). Thus, if the main base station 2-1 receives the signal Ack or Nack directly from the terminal station 1, the main base station 2-1 does not take account of the signals received by and transferred from the other base stations 2-2 to 2-n respectively but discards them.

No response is returned relative to the transmitted packet data 3 or an unidentified signal is returned relative to it. Therefore, the signals received by and transferred from the other base stations 2-2 to 2-n are waited for in order to judge whether the packet data 3 has been correctly received (S211 and S204 to S206). In this example, as the received signals are signals Ack, the next packet data 4 is transmitted (S207). According to the prior art, if a returned signal is unidentified, the same packet data 3 is immediately retransmitted unlike the prior art, as the packet data 3 is not retransmitted in vain, a delay can be minimized. On the other hand, referring to FIG. 11B, the signals Nack are transferred as a response to the packet data 3 from the other base stations 2-2 to 2-n respectively. Thereafter, the same packet data 3 is retransmitted (S208). In this case, retransmission is delayed by a wait time during which the signals transferred from the other base stations 2-2 to 2-n are waited for However, in general, when a system is designed, an error rate for downstream packet data is set to $10^{-1}$ or less, and an error rate for an upstream control signal Ack or Nack is set to $10^{-1}$ or less. Incidentally, transmission lines leading to different base stations do not have a correlation with one another. Consequently, if the packet error rate is $10^{-1}$, the base-station upper-level system 3 transfers the signal Ack at a probability of 90%. Namely, the example shown in FIG. 11A takes place at the probability of 90%, while the example shown in FIG. 11B takes place at the probability of 10%. Consequently, data transfer is achieved highly efficiently. Moreover, an event that, although the terminal station 1 has correctly received packet data, the main base station 2-1 judges that a response to the packet data is unidentified and retransmits the same packet data, hardly takes place. This leads to a reduced line occupancy rate.

As mentioned above, the first retransmission control method in accordance with the present invention does not cause an unnecessary delay but is executed highly efficiently.

Figure 13:
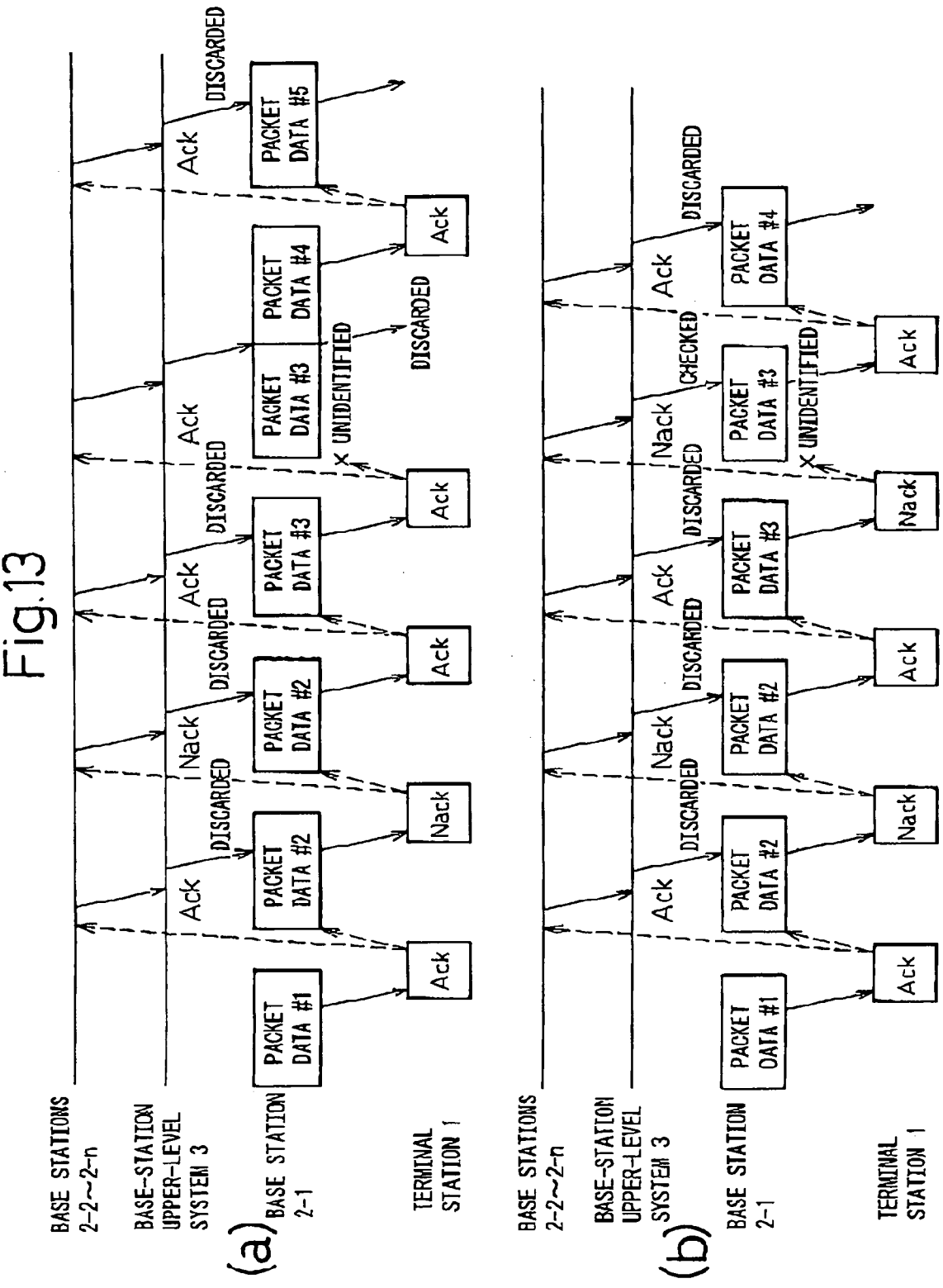
FIG. 13A and FIG. 13B show examples of retransmission of packet data in a second retransmission control method in accordance with the present invention.
Figure 14:
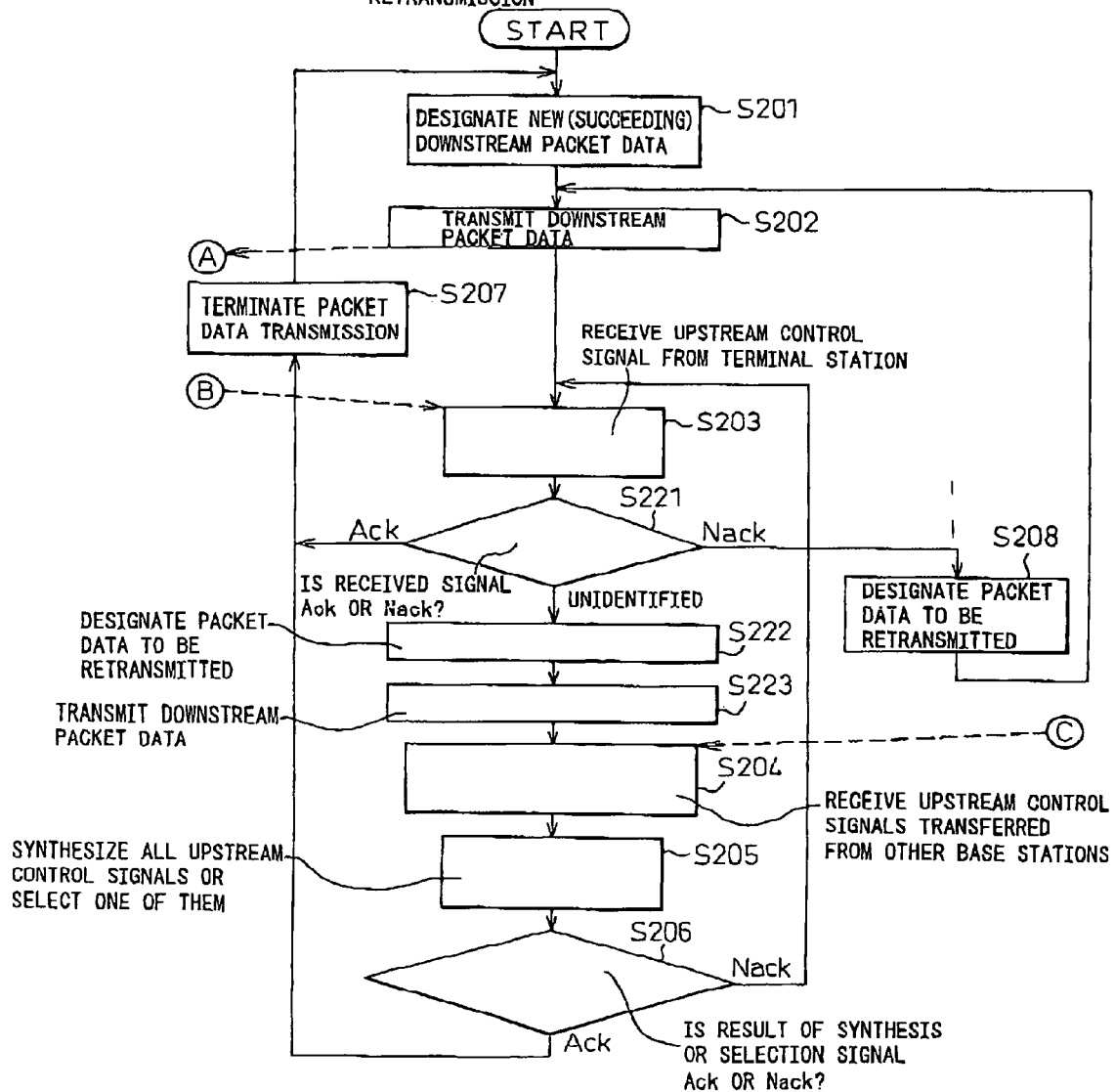
FIG. 14 is a flowchart describing an example of the second retransmission control method in accordance with the present invention.

FIG. 13A and FIG. 13B show examples of retransmission of packet data according to a second retransmission control method in accordance with the present invention. FIG. 14 is a flowchart describing a second retransmission control process based o the present invention. FIG. 13A shows an example in which the terminal station 1 receives packet data 3 and returns a signal Ack, while FIG. 13B shows an example in which the terminal station 1 receives the packet data 3 and returns a signal Nack. Packet data 1 and packet data 2 shown in FIG. 13A and FIG. 13B are handled in the same manner as those shown in FIG. 11A and FIG. 11B respectively, and will therefore not be reiterated.

Referring to FIG. 13A, if a response to the packet data 3 transmitted from the main base station 2-1 is unreturned or unidentified, the main base station 2-1 tentatively identifies the response as the signal Nack and retransmits the same packet data 3 (S221 to S223). At the same time, the main base station 2-1 waits for a signal transferred from the base-station upper-level system 3 (S204). Herein, the signal transferred from the base-station upper-level system 3 shall be the signal ANK. Consequently, packet data 4 is transmitted (S205 to S207). Eventually, the packet data 3 retransmitted because the response is unidentified is wasted. However, a delay in retransmission is shorter than that occurring when the signal transferred from the base-station upper-level system 3 is waited for on the other hand, in the example shown in FIG. 13B, the signals Nack that are returned as the response to the packet data 3 are transferred from the other base stations 2-2 to 2-n respectively. However, as the same packet data 3 has already been retransmitted, nothing is performed (S206). Consequently, when the response is unidentified, even if the signal Nack is transferred from the base-station upper-level system 3, a delay is the same as that occurring during the normal retransmission control process.

As mentioned above, according to the second retransmission control method of the present invention, even if the terminal station 1 correctly receives downstream packet data, the packet data may be retransmitted. Compared with the first retransmission control method in accordance with the present invention, a line occupancy rate increases. However, a delay time deriving from the retransmission control process can be reduced.

Figure 15:
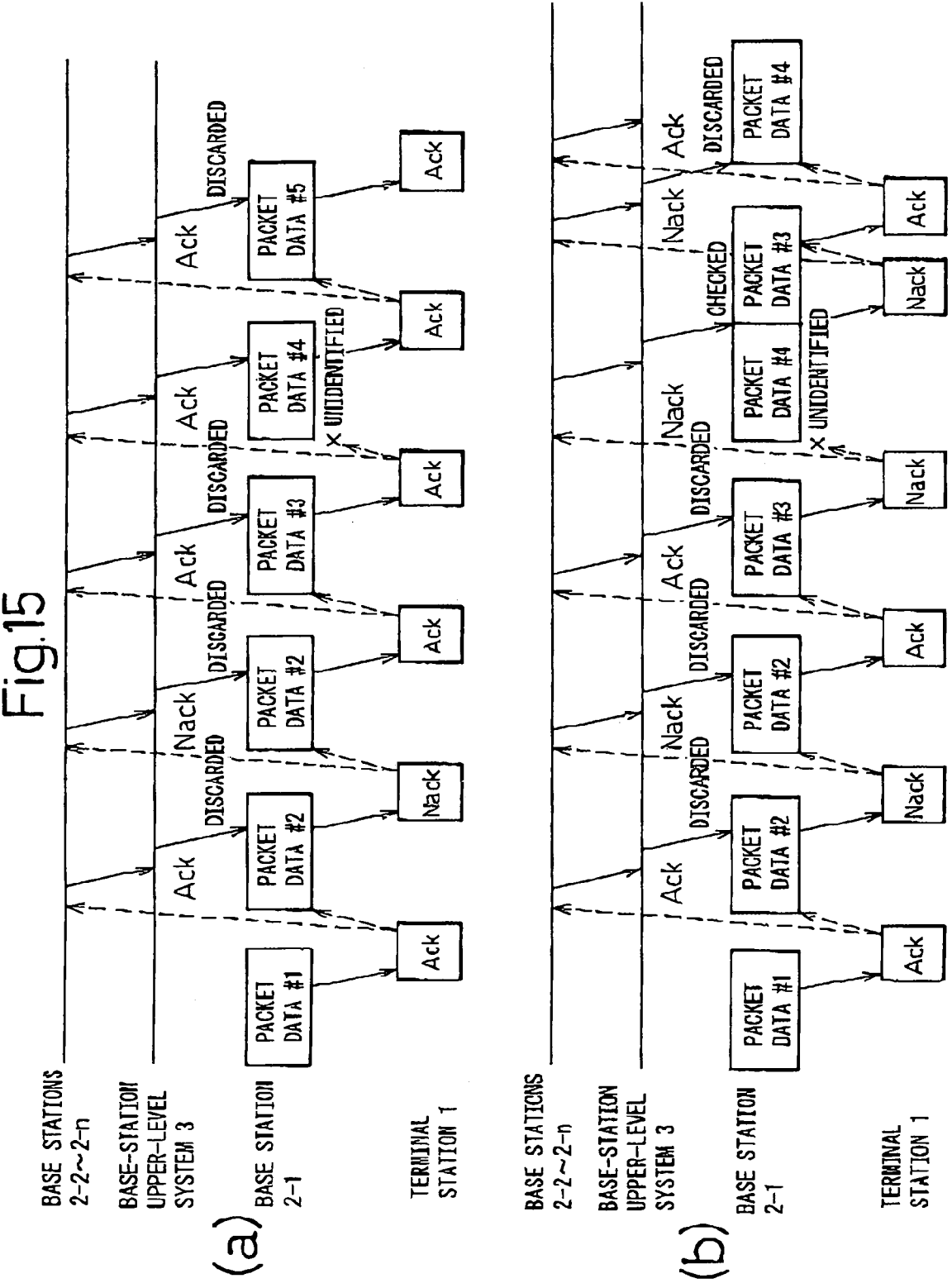
FIG. 15A and FIG. 15B show examples of retransmission of packet data in a third retransmission control method in accordance with the present invention.
Figure 16:
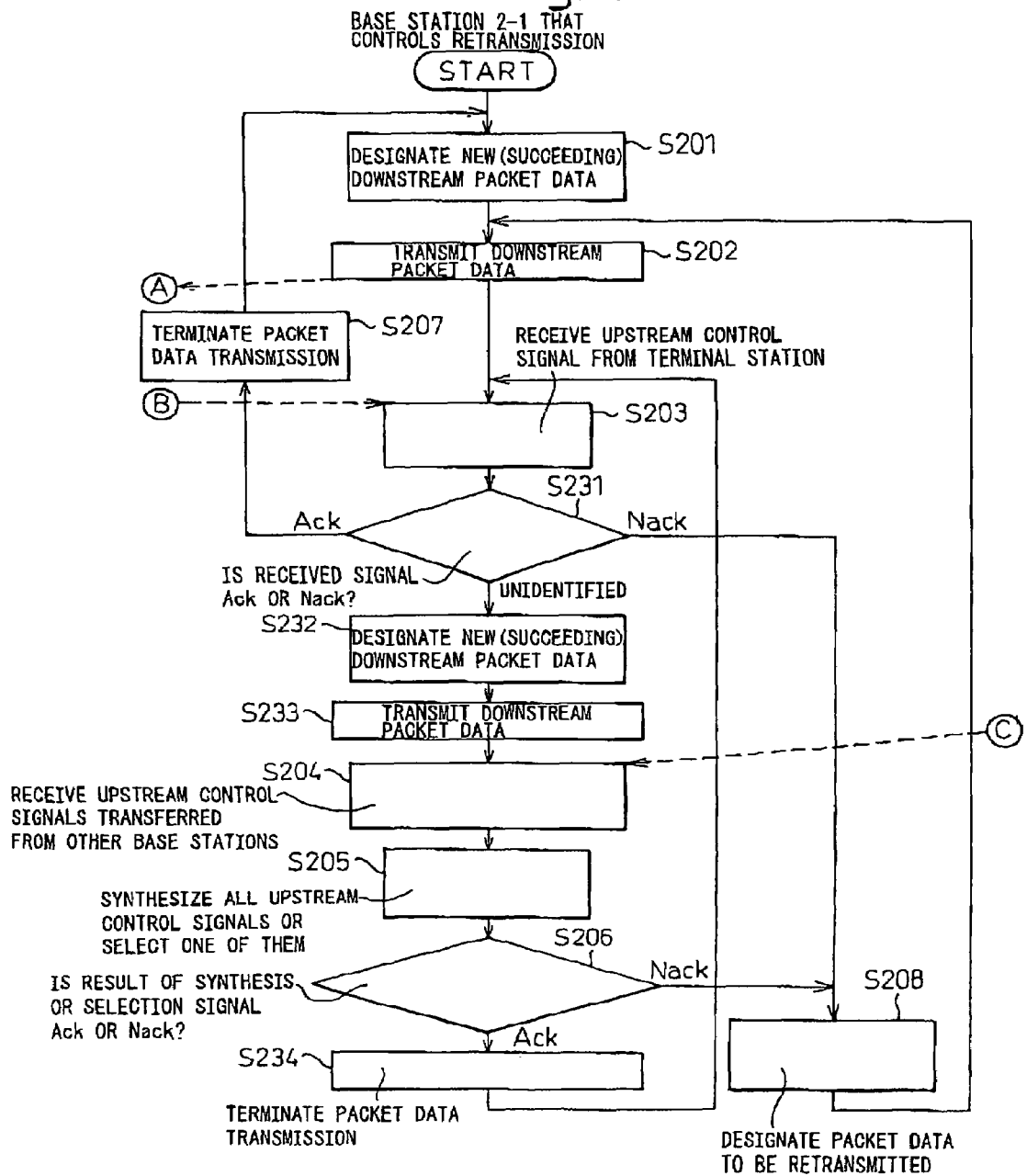
FIG. 16 is a flowchart describing an example of the third retransmission control process in accordance with the present invention.

FIG. 15A and FIG. 15B show examples of retransmission of packet data in a third retransmission control method in accordance with the present invention. FIG. 16 is a flowchart describing a third retransmission control process based on the method of the present invention shown in FIG. 15A and FIG. 15B. FIG. 15A shows an example in which the terminal station 1 receives packet data 3 and returns a signal Ack, while FIG. 15B shows an example in which the terminal station 1 receives the packet data 3 and returns a signal Nack. Packet data 1 and packet data 2 shown in FIG. 15A and FIG. 15B are handled in the same manner as those shown in FIG. 11A and FIG. 11B, and the handling of the packet data 1 and packet data 2 will not be described below.

Referring to FIG. 15A, if a response to the packet data 3 transmitted from the main base station 2-1 is unreturned or unidentified, the main base station 2-1 tentatively identifies the response as the signal Ack and transmits the next packet data 4 (S231 to S233). At the same time, the main base station 2-1 waits for a signal transferred from the base-station upper-level system 3 (S204). Herein, the signal transferred from the base-station upper-level system 3 shall be the signal Ack. Consequently, nothing is performed but the retransmission control process is terminated (5206 and S234). Thus, even if the response is unidentifiable, a delay deriving from retransmission control is reduced. On the other hand, referring to FIG. 15B, the signal Nack is received as the response to the packet data 3 from each of the other base stations 2-2 to 2-n. In this case, the tentatively identified signal Ack is judged to be incorrect, and the previous packet data 3 is retransmitted (S206 and S208). Consequently, the packet data 4 is wasted. However, as described in relation to the first retransmission control method of the present invention, the control signal sent from the terminal station 1 is the signal Ack at the probability of 90%. Therefore, the example shown in FIG. 15A is thought to take place mainly.

As mentioned above, according to the third retransmission control method of the present invention, although the terminal station 1 does not correctly receive downstream packet data, if succeeding packet data is found, the succeeding packet data is transmitted. Compared with the first retransmission method in accordance with the present invention, a line occupancy rate increases but a delay deriving from retransmission control is reduced.

FIG. 17 lists for comparison the first to third retransmission control methods in accordance with the present invention.

As seen from FIG. 17, according to the present invention, an upstream control signal is given a diversity handover gain (Δ). Moreover, according to the first retransmission control method of the present invention when the upstream control signal is unidentified, signals Ack or Nack to be transferred from the other base stations 2-2 to 2-n respectively are waited for without retransmission of packet data through tentative identification or without transmission of succeeding packet data. Therefore, a delay is long (Δ). However, a line occupancy rate decreases (◦). In contrast, according to the second and third retransmission control methods of the present invention, if the upstream control signal is unidentified, packet data is retransmitted through tentative identification or succeeding packet data is transmitted. Therefore, the delay is short (◦), but the line occupancy rate increases accordingly (Δ).

The above description demonstrates that the line occupancy rate has a significant meaning in retransmission control. Hereinafter, a description will be made of some embodiments in which a process of handling a degree of line use (traffic) is added to each of the first to third retransmission control processes based on the methods of the present invention.

Figure 18:
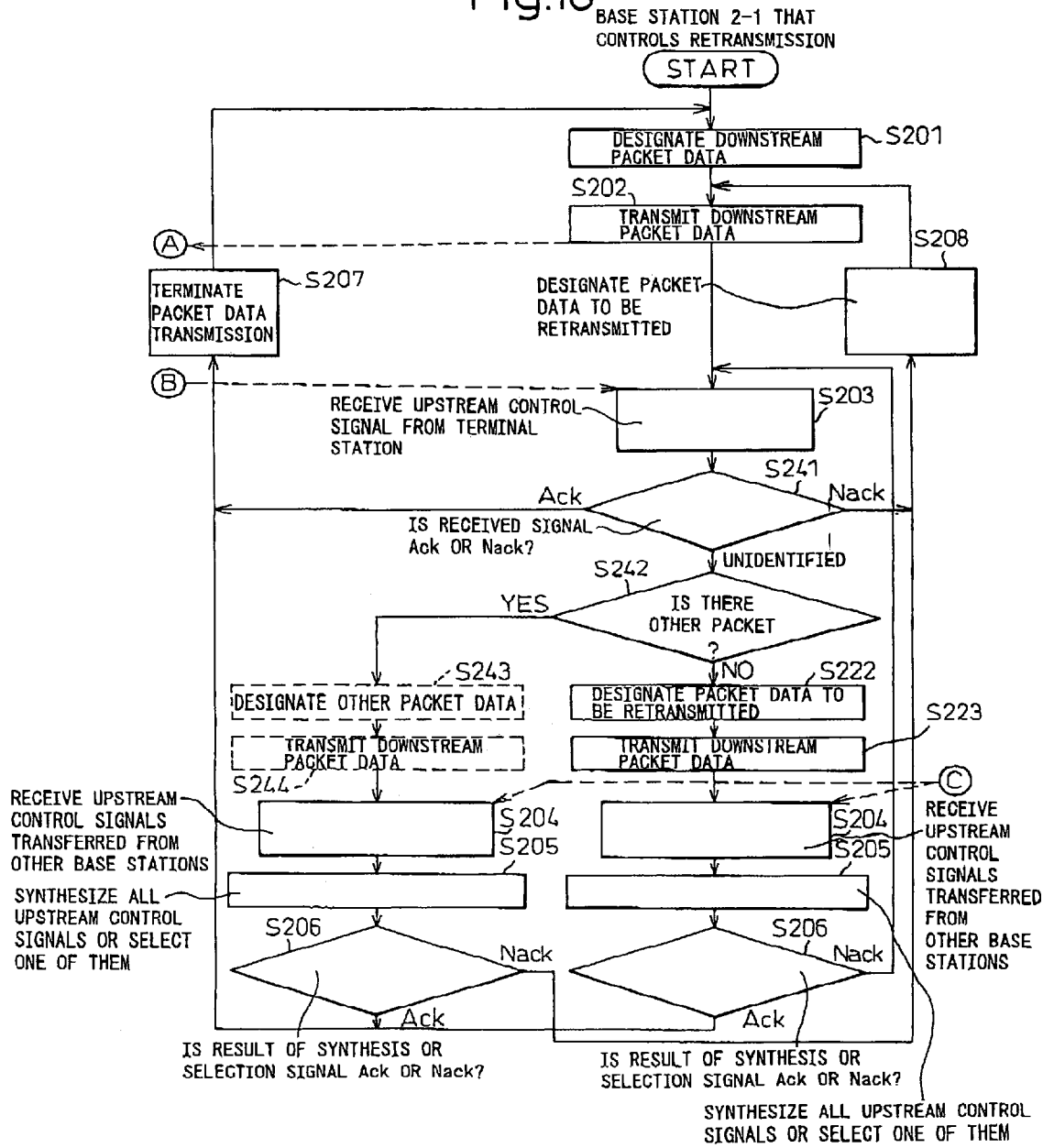
FIG. 18 is a flowchart describing an example of a retransmission control process including handling of traffic.
Figure 19:
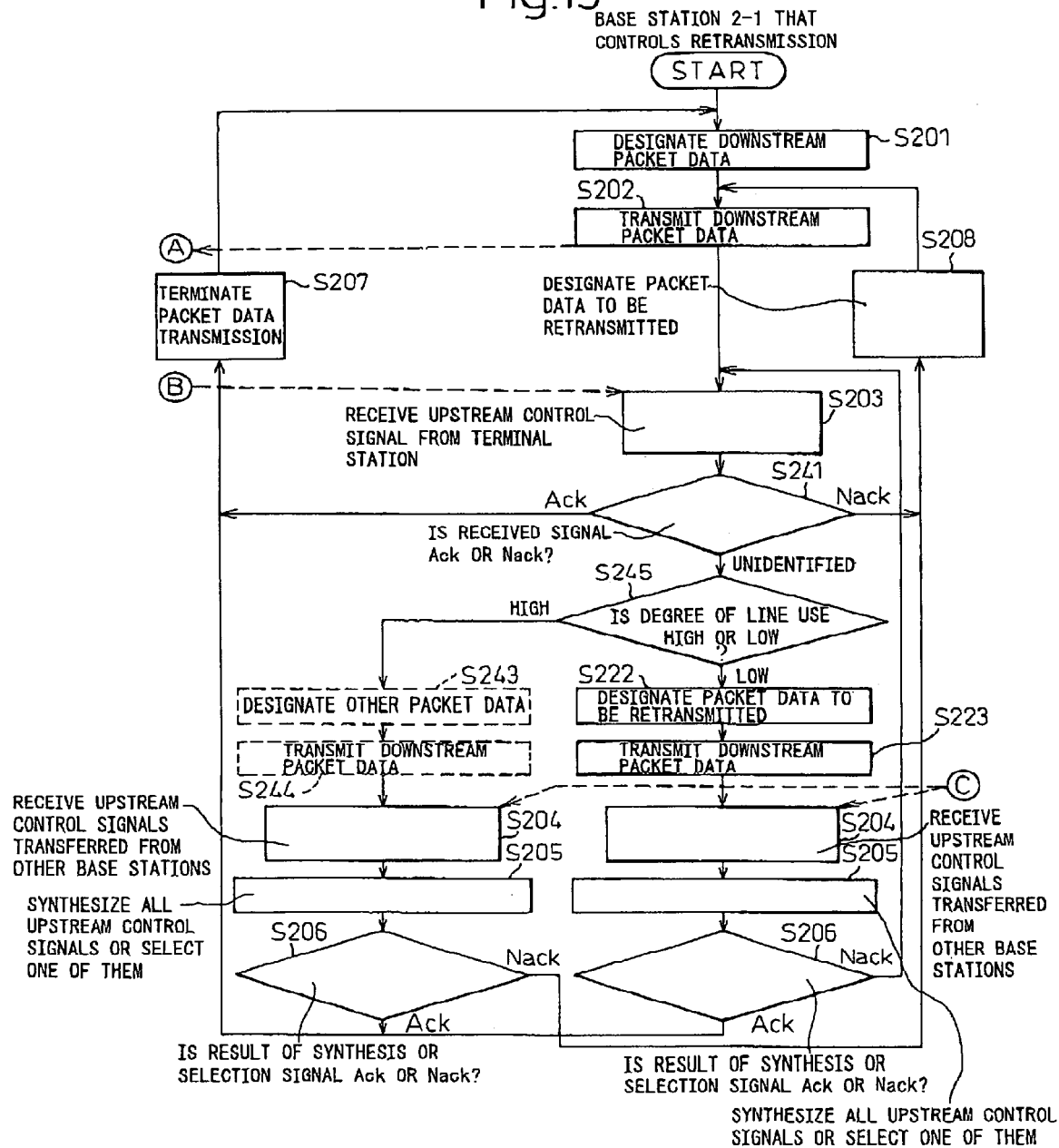
FIG. 19 is a flowchart describing another example of a retransmission control process including handling of traffic.

FIG. 18 and FIG. 19 are flowcharts describing retransmission control processes including the traffic handling process. Herein, what is referred to as "traffic on a downstream channel" refers to the traffic on a downstream packet channel employed or the degree of use to which each base station uses a line. In the cases described in the drawings, the first and second retransmission control processes based on the methods of the present invention are switched based on traffic. Specifically, when traffic is heavy, the first retransmission control process based on the method of the present invention is adopted. When traffic is light, the second retransmission control process based on the method of the present invention is adopted:

(1) Method of Switching the Processes According to the Traffic on the Packet Channel FIG. 18 describes an embodiment in which the traffic on a downstream packet channel is adopted as the traffic on a downstream channel. Physically one downstream packet channel is employed on a one channel-to-multiple communications basis. Therefore, sharing one channel by a plurality of terminal stations is preferable to occupancy of one channel by one terminal station 1. Consequently, in this cage, when an upstream control signal received from the terminal station 1 is unidentified, the main base station 2-1 that controls retransmission judges whether packet data to be terminated at another terminal is present on a certain channel to be employed (S241 and S242).

If packet data to be transmitted to another terminal is judged to be present (if traffic is heavy), the first retransmission control process based on the method of the present invention in which no packet data is retransmitted through tentative identification is executed (S204 and S205) (see FIG. 12). Incidentally, actions (S243 and S244) described within rectangles drawn with a dashed line are performed on packet data addressed to a terminal station other than the terminal station to which the downstream packet data is transmitted (packet data addressed to other terminal station and multiplexed with a signal on the same channel). On the other hand, if packet data to be addressed to another terminal is absent (if traffic is light), the second retransmission control process based on the method of the present invention in which traffic increases because packet data is retransmitted through tentative identification is executed (S222 and S223) (see FIG. 14).

(2) Method of Switching the Processes According to the Degree of Line Use to Which a Base Station Uses a Line FIG. 19 describes an embodiment in which the degree of use to which a base station uses a line is adopted as the traffic on a downstream channel. When consideration is taken into interference with other communication, signal strength to be transmitted is preferably small. An increase in a magnitude of interference adversely affects communication quality and a channel capacity. In particular, when the degree of line use is high, the increase in a magnitude of interference greatly affects communication quality. At worst, a call may be cleared. Since high-speed data transmission terribly interferes with another station, the event that a call is cleared is likely to occur. Therefore, in this embodiment, if an upstream control signal originated from the terminal station 1 and terminated at the main base station 2-1 that controls retransmission is unidentified, the degree of line use to which the main base station 2-1 uses a line is judged (S241 and S245). For example, if packet data to be transmitted from the main base station 2-1 is absent, the degree of line use is judged to be low. If packet data to be transmitted is present, the degree of line use is judged to be high.

If the degree of line use is judged to be high (if traffic is heavy), the first retransmission control process based on the method of the present invention in which packet data is not retransmitted through tentative identification is executed (S204 and S20S) (see FIG. 12). If the degree of line use is judged to be low (if traffic is light), the second retransmission control process based on the method of the present invention in which traffic increases because packet data is retransmitted through tentative identification is executed (S222 and S223) (see FIG. 14).

In the two aforesaid embodiments (1) and (2), either of the first and second retransmission control processes based on the methods of the present invention is selected based on traffic. Likewise, either of the first and third retransmission control processes based on the methods of the present invention may be selected based on traffic. In this case, when traffic is heavy, the first retransmission control process based on the method of the present invention is executed. When traffic is light, the third retransmission control process based on the method of the present invention is executed.

Figure 20:
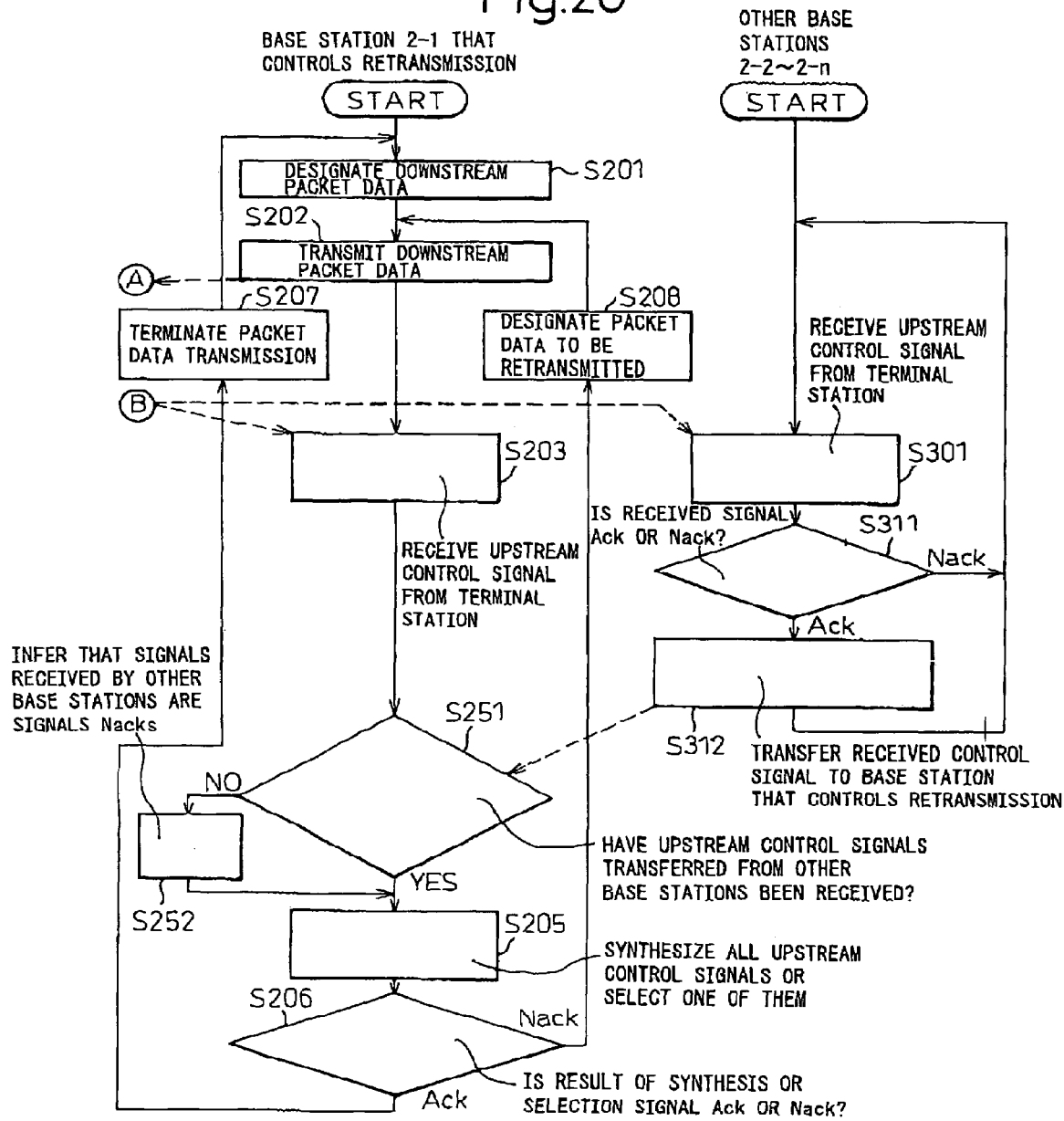
FIG. 20 is a flowchart (1) describing an example of a process involving a main base station and other base stations.
Figure 21:
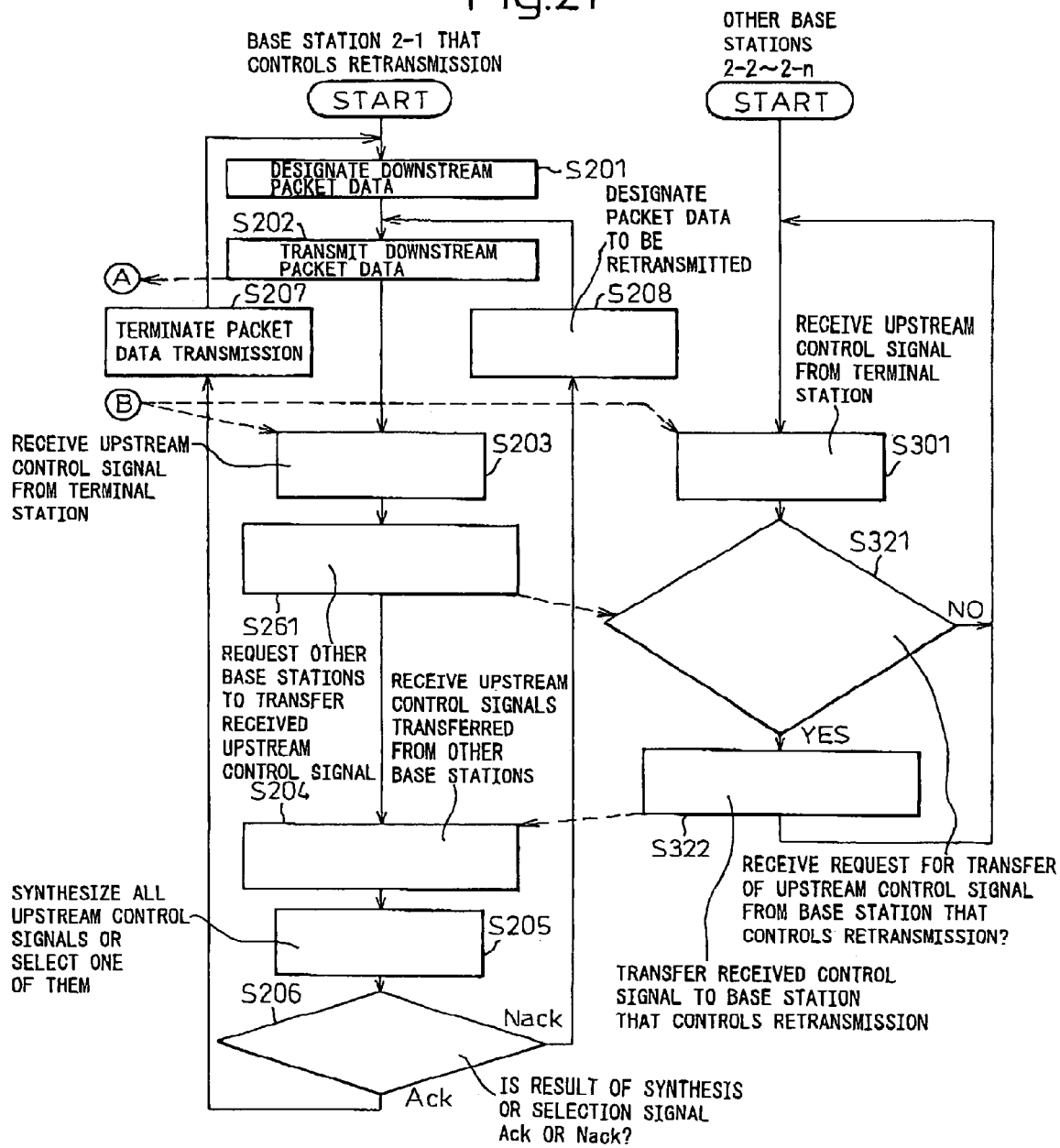
FIG. 21 is a flowchart (2) describing another example of a process involving the main base station and the other base stations.

The retransmission control processes to be executed in the main base station 2-1 have been mainly described so far. Referring to FIG. 20 and FIG. 21, some embodiments in which the other base stations 2-2 to 2-n are involved will be described in relation to the first to third retransmission control methods in accordance with the present invention. The embodiments attempt to cope with a common problem, or in other words, attempt to prevent occurrence of unnecessary traffic during a retransmission control process and prevent a delay in retransmission. The description will proceed on the assumption that the basic retransmission control process based on the present invention (FIG. 10) is employed as an essential process.

FIG. 20 is a flowchart describing an example (1) of a process in which control is exchanged between the main base station and the other base stations.

In the present embodiment, only when upstream control signals the other base stations 2-2 to 2-n have received from the terminal station 1 are signals Ack, the signals are transferred to the main base station 2-1 (S301, S311, and S312). The other base stations 2-2 to 2-n have to follow an additional step of identifying a received signal (S311). Accordingly, the main base station 2-1 has to follow an additional step at which if no signals are transferred from the other base stations 2-2 to 2-n to the main base station 2-1 that controls retransmission, the main base station 2-1 infers that the signals received by the other base stations 2-2 to 2-n are signals Nack (S251 and S252).

FIG. 21 is a flowchart describing an example (2) of a process in which control is exchanged between the main base station and the other base stations.

In the present embodiment, the main base station 2-1 that controls retransmission requests the other base stations 2-2 to 2-n to transfer a received upstream control signal (S261). In response to the request, the other base stations 2-2 to 2-n transfer the upstream control signals (S321 and S322). The main base station 2-1 controls retransmission according to the received upstream control signals.

Figure 22:
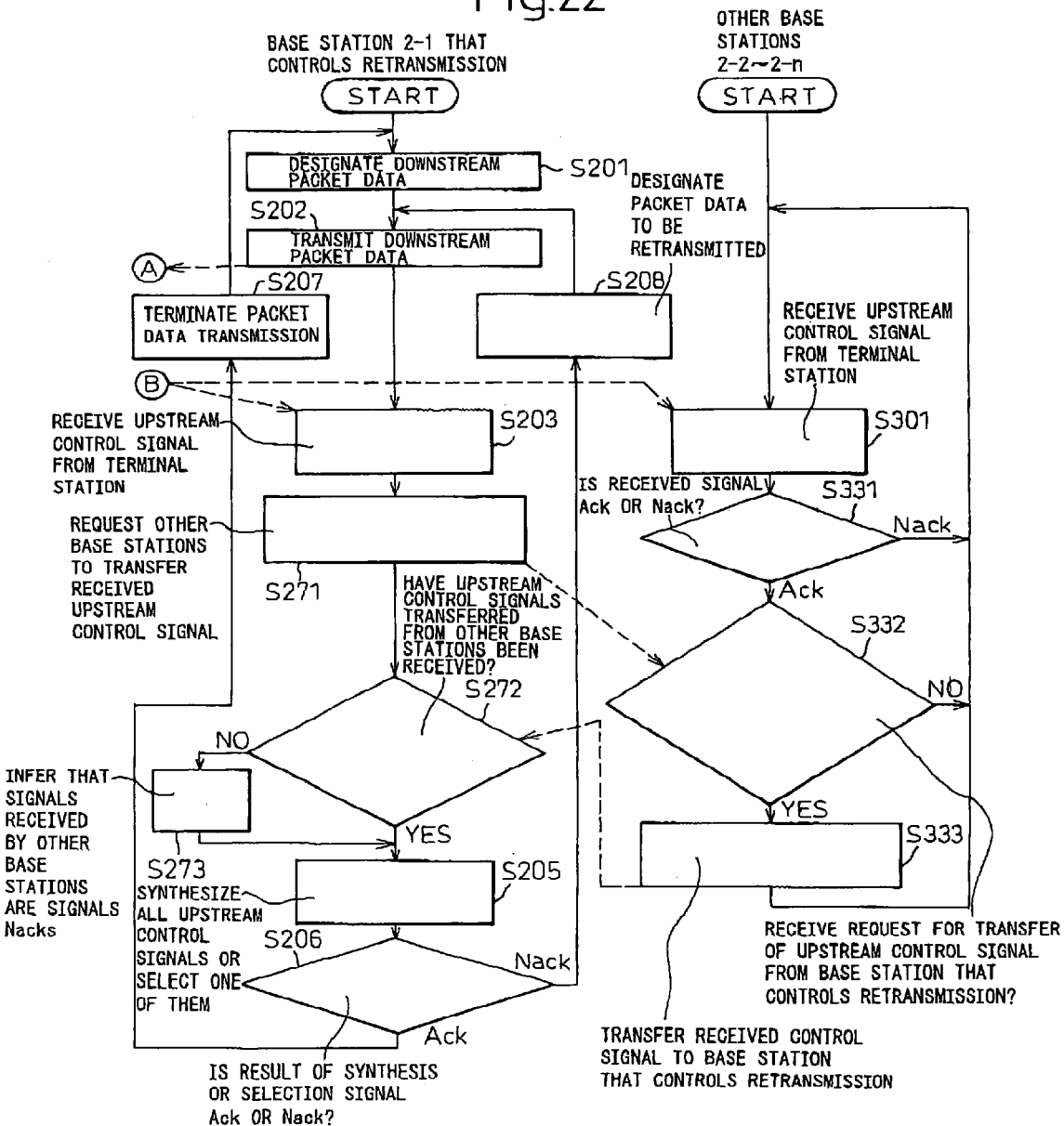
FIG. 22 is a flowchart (3) describing another example of a process. Involving the main base station and the other base stations.

FIG. 22 is a flowchart describing an example (3) of a process in which control is exchanged between the main base station and the other base stations.

In the present embodiment, the processes described in FIG. 20 and FIG. 21 are mixed. Namely, only when upstream control signals the other base stations 2-2 to 2-n have received from the terminal station 1 are signals Ack, the other base stations 2-2 to 2-n transfer the signals to the main base station 2-1 (S331). Only when the main base station 2-1 requests the other base stations to transfer a received upstream control signal (S271), the other base stations 2-2 to 2-n transfer the upstream control signals Ack to the main base station 2-1 (S332 and S333). If the other base stations 2-2 to 2-n do not transfer the signals despite the request, the main base station 2-1 infers that the other base stations 2-2 to 2-n have received signals Nack (S272 and S273).

Figure 23:
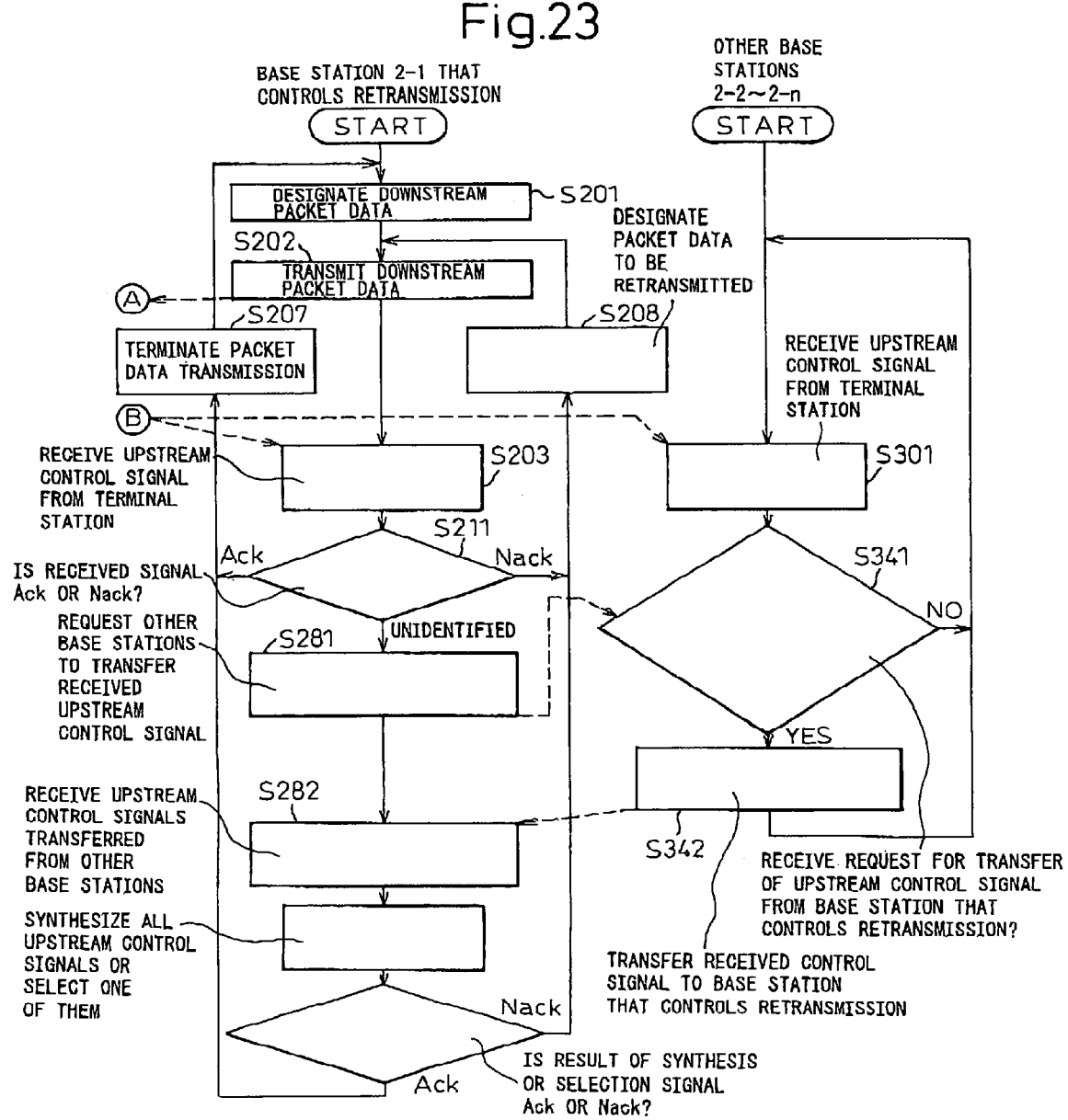
FIG. 23 is a flowchart (4) describing another example of a process involving the main base station and the other base stations.

FIG. 23 is a flowchart describing an example (4) of a process in which control is exchanged between the main base station and the other base stations.

The present embodiment corresponds to the first retransmission control process based on the first method of the present invention (FIG. 12) to which the process described in FIG. 21 is added. Namely, only when an upstream control signal received directly from the terminal station 1 is unidentified, the main base station 2-1 requests the other base stations 2-2 to 2-n to transfer a received upstream control signal (S211 and S281). In response to the request, the other base stations 2-2 to 2-n transfer the upstream control signals (S341 and S342). The main base station 2-1 controls retransmission according to the received upstream control signals.

Figure 24:
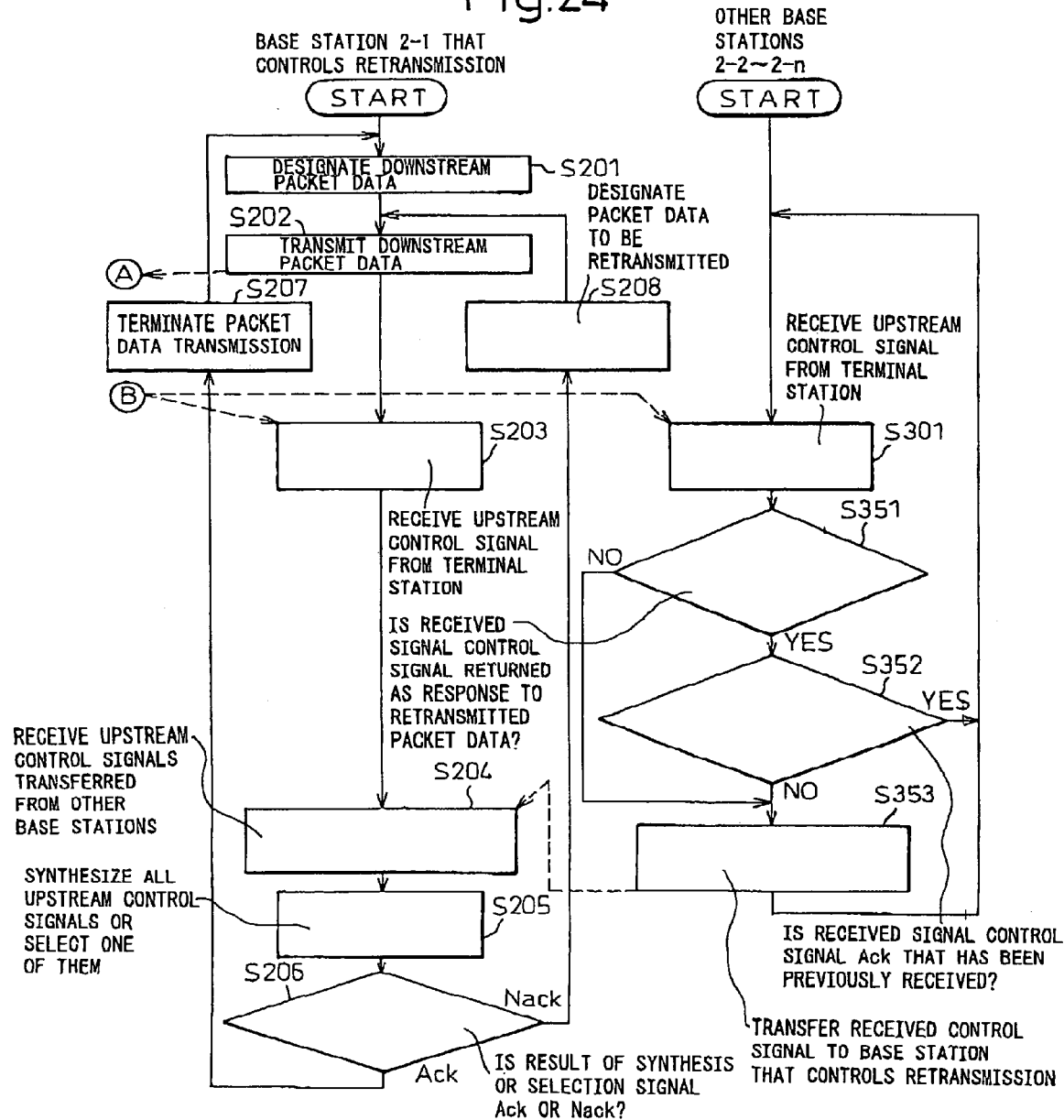
FIG. 24 is a flowchart (5) describing another example of a process involving the main base station and the other base stations.

FIG. 24 is a flowchart describing an example (5) of a process in which control is exchanged between the main base station and the other base stations.

The control flow is supposed to be adapted to a case where the other base stations 2-2 to 2-n receive an upstream control signal Ack as a response to packet data from the terminal station 1, and transfers the received signal to the main base station 2-1; and; at the same time, the main base station 2-1 judges that the upstream control signal received from the terminal station 1 is a signal Nack or an unidentified signal and retransmits the same packet data. In this case, the other base stations 2-2 to 2-n receive the signal Ack as a response to the same packet data from the terminal station 1 twice or more due to retransmission. Consequently, according to the present embodiment, a step of judging whether a received control signal is a control signal returned as a response to retransmitted packet data (351) and a step of judging whether a signal Ack has been Previously received as the control signal (S352) are added. If both the judgments are made in the affirmative, the received signal is not transferred to the main base station 2-1.

Incidentally, the reliability of a result of identification as a signal Ack or a signal Nack performed as described in conjunction with FIG. 8 and FIG. 9 (a value closer to a threshold for identification) may be appended to a received signal whose reception is notified by the other base stations 2-2 to 2-n. This helps the main base station 2-1 make a more accurate judgment.

As described above, according to the present invention, retransmission is controlled based on HSDPA technology or the like, which is advantageous in terms of a line occupancy rate or a delay time in retransmission, during high-speed large-capacity data transmission that is presumed to be the mainstream of data transmission in the future. Moreover, a packet data retransmission control method and system enjoying higher efficiency in retransmission control can be provided by further improving the line occupancy rate or the delay time in retransmission.

The invention claimed is:

1. A packet data retransmission control method to be adapted to a network accommodating a base-station upper-level control system, a plurality of base stations subordinate to said base-station upper-level control system, and a terminal station, comprising:
   a step at which said base-station upper-level control system transmits downstream packet data, which is terminated at said terminal station, to said plurality of base stations;
   a step at which a specific base station that is one of said base stations transfers the downstream packet data to said terminal station;
   a step at which said plurality of base stations receives an upstream control signal that is returned from said terminal station in order to acknowledge reception of the downstream packet data;
   a step at which base stations other than said specific base station notify said specific base station via said base-station upper-level control system that they have received the upstream control signal; and
   a step at which said specific base station determines packet data to be retransmitted according to the receiving situation thereof for the upstream control signal returned from said terminal station and the receiving situations of said other base stations for the upstream control signal.

2. A packet data retransmission control method according to claim 1, further comprising a step at which said specific base station judges from the receiving situation thereof for the upstream control signal returned from said terminal station whether an acknowledgement response, a negative acknowledgement response, or an unidentified response is returned as a result of reception of the downstream packet data from said terminal station.

3. A packet data retransmission control method according to claim 2, further comprising a step at which: if an acknowledgement response is judged to be returned, said specific base station transmits succeeding packet data; and if a negative acknowledgement response is judged to be returned, said specific base station retransmits packet data.

4. A packet data retransmission control method according to claim 2, further comprising a step at which if an unidentified response is judged to be returned, said specific base station waits for upstream control signals whose reception is notified by said other base stations, and then judges whether said specific base station should retransmit the packet data.

5. A packet data retransmission control method according to claim 2, further comprising a step at which: if an unidentified response is judged to be returned, said specific base station retransmits packet data; and if the upstream control signals whose reception is notified by said other base stations carry an acknowledgement response, said specific base station does not check a response to the retransmitted packet data but immediately transmits succeeding packet data.

6. A packet data retransmission control method according to claim 2, further comprising a step at which: if an unidentified response is judged to be returned, said specific base station transmits succeeding packet data; and if the upstream control signals whose reception is notified by said other base stations carry a negative acknowledgement response, said specific base station retransmits the packet data.

7. A packet data retransmission control method according to claim 2, further comprising a step at which: when an unidentified response is judged to be returned, if an amount of downstream packet data is large or the traffic on a downstream channel is heavy, said specific base station waits for the upstream control signals whose reception is notified by said other base stations; if the upstream control signals carry an acknowledgement response, said specific base station transmits succeeding packet data; and if the upstream control signals carry a negative acknowledgement response, said specific base station retransmits packet data.

8. A packet data retransmission control method according to claim 2, further comprising a step at which: when an unidentified response is judged to be returned, if the traffic on the downstream channel is light, said specific base station retransmits the packet data; and if the upstream control signals whose reception is notified by said other base stations carry an acknowledgement response, said specific base station does not check a response to the retransmitted packet data but immediately transmits succeeding packet data.

9. A packet data retransmission control method according to claim 2, further comprising a step at which: when an unidentified response is judged to be returned, if the traffic on the downstream channel is light, said specific base station transmits succeeding packet data; if the upstream control signals whose reception is notified by said other base stations carry a negative acknowledgement response, said specific base station retransmits the packet data and invalidates the transmitted succeeding packet data.

10. A packet data retransmission control method according to claim 1, further comprising:
   a step at which only when a received upstream control signal returned from said terminal station carries an acknowledgement response, said other base stations notify said specific base station that they have received the upstream control signal; and a step at which, if said other base stations do not notify reception of an upstream control signal, said specific base station infers that a negative acknowledgement response has been returned.

11. A packet data retransmission control method according to claim 1, further comprising:

a step at which said specific base station requests said other base stations to notify reception of an upstream control signal; and a step at which if the notification request is issued, said other base stations notify said specific base station of the receiving situation for the upstream control signal.

12. A packet data retransmission control method according to claim 2, further comprising a step at which if said specific base station judges that neither an acknowledgement response nor a negative acknowledgement response is returned as a result of reception, said specific base station requests said other base stations to notify reception of an upstream control signal.

13. A packet data retransmission control method according to claim 1, further comprising a step at which after said other base stations notify said specific base station that they have received an upstream control signal which is returned from said terminal station and which carries an acknowledgement response, said other base stations do not notify said specific base station that they have received an upstream control signal which is returned as a response to the same packet data from said terminal station and which carries the acknowledgement response.

* * * * *